United States Patent
Myrick et al.

(10) Patent No.: US 12,455,028 B1
(45) Date of Patent: Oct. 28, 2025

(54) HIGH PRESSURE PIPE SWIVEL ASSEMBLY

(71) Applicant: Legacy Forward Innovations LLC, Flint, TX (US)

(72) Inventors: Paul Myrick, Flint, TX (US); Logan Kennedy, Palestine, TX (US)

(73) Assignee: Legacy Forward Innovations LLC, Flint, TX (US)

( * ) Notice: Subject to any disclaimer, the term of this patent is extended or adjusted under 35 U.S.C. 154(b) by 0 days.

(21) Appl. No.: 19/257,175

(22) Filed: Jul. 1, 2025

(51) Int. Cl.
*F16L 27/08* (2006.01)

(52) U.S. Cl.
CPC ....... *F16L 27/0824* (2013.01); *F16L 27/0816* (2013.01)

(58) Field of Classification Search
CPC . F16L 27/0816; F16L 27/082; F16L 27/0824; F16L 27/0828
USPC ................. 285/387, 388, 280, 281
See application file for complete search history.

(56) References Cited

U.S. PATENT DOCUMENTS

| | | | | |
|---|---|---|---|---|
| 904,673 A * | 11/1908 | Bideker | ............ | F16L 27/0812 239/587.5 |
| 1,629,650 A * | 5/1927 | Brauer | ............ | E21B 21/02 285/280 |
| 2,279,969 A * | 4/1942 | Casperson | ............ | E21B 21/02 285/280 |
| 2,770,475 A * | 11/1956 | Rafferty | ............ | F16L 27/0832 285/94 |
| 2,817,543 A * | 12/1957 | Corsette | ............ | F16L 27/0824 285/98 |
| 2,879,083 A * | 3/1959 | Corsette | ............ | F16L 27/0832 285/181 |
| 2,882,073 A * | 4/1959 | James | ............ | F16L 17/025 285/113 |
| 3,048,415 A * | 8/1962 | Shook | ............ | F16L 17/025 277/625 |
| 4,272,108 A * | 6/1981 | Maasberg | ............ | F16L 27/0832 285/900 |
| 4,695,078 A * | 9/1987 | Anderson | ............ | F16L 27/082 285/280 |
| 9,803,784 B2 * | 10/2017 | Gamble | ............ | F16L 25/0054 |
| 2014/0174653 A1 * | 6/2014 | Babcanec | ............ | F16L 21/035 156/293 |

OTHER PUBLICATIONS

FMC Corporation Fluid Control Division: Chiksan Original Swivel Joints "A complete line of swivel joints for drilling, production, and well servicing"; Copyright 1997, FMC CorporationPrinted in U.S. A., HP 5.0M 3-97; 16 pages.

\* cited by examiner

*Primary Examiner* — David Bochna

(57) ABSTRACT

A pipe swivel assembly is provided including a body, an outer bearing, a stem, an inner bearing, and a locking collar, all annular about a central axis. The body includes a threaded socket and tapered throat. The stem includes a tapered nose and barrel section with a radial flange. The inner bearing is received in the socket and is trapped by the flange when the nose is at a predetermined distance from the throat. The outer bearing is trapped by the locking collar against the flange when the collar barrel is screwed into the threaded socket. A seal extends between an angled seat on the nose and an angled sealing surface of the throat. The stem can rotate around the central axis relative to the body without breaking the fluid tight seal between the stem and the body.

13 Claims, 16 Drawing Sheets

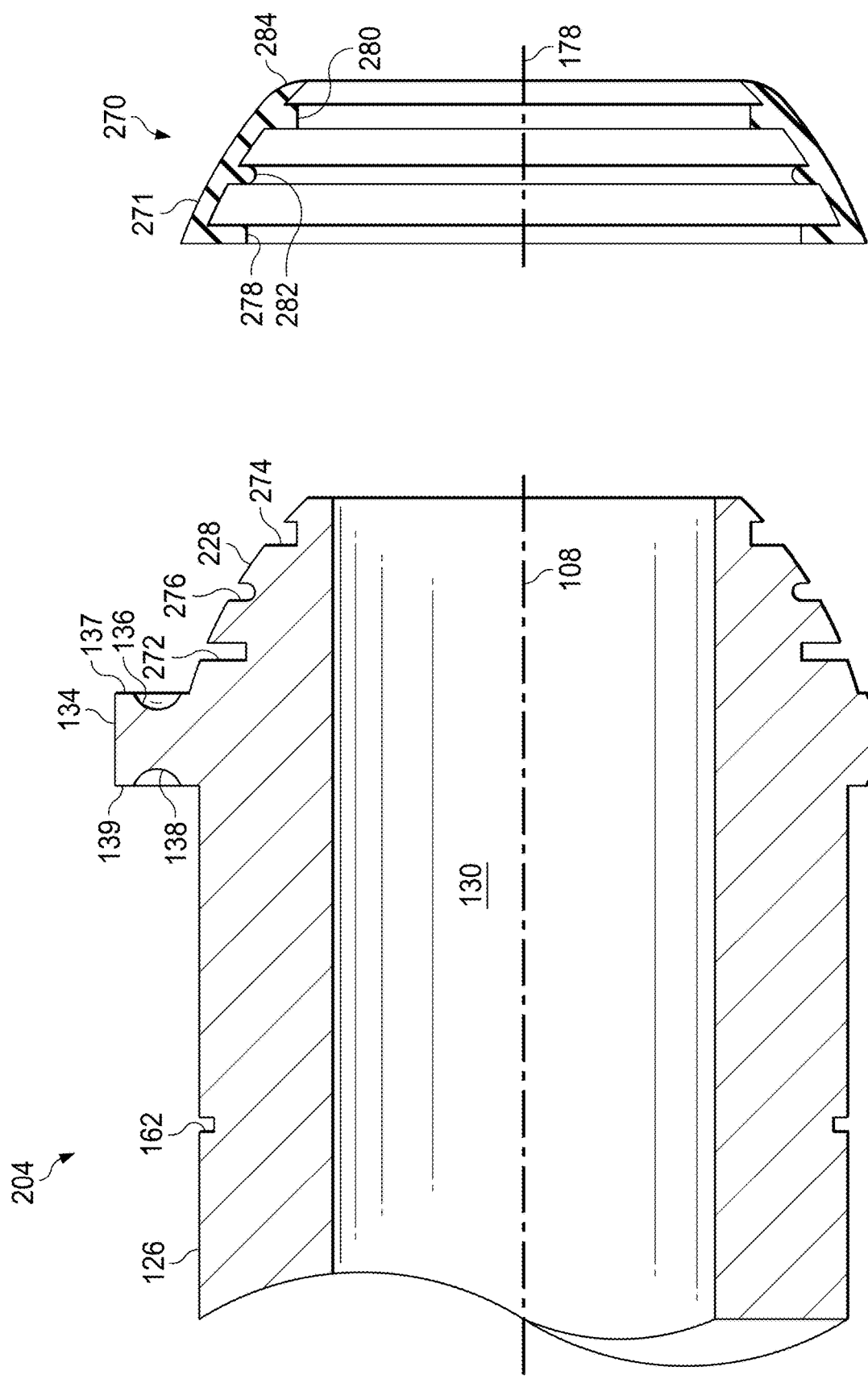

HIGH PRESSURE PIPE SWIVEL ASSEMBLY

TECHNICAL FIELD

This disclosure relates to pipe swivels assemblies for use in high pressure applications, and particularly to pipe swivels using internal ball bearings to facilitate swiveling.

BACKGROUND

High-pressure swivel joints are critical components in the oil and gas industry, particularly in applications involving the transfer of fluids under extreme pressures. These joints, such as those sold under the Chiksan® brand, enable pivotal connection points between rigid piping systems while allowing for rotation and angular movement. Their design accommodates both axial and radial loads while maintaining a pressure-tight seal, which is essential for safe and efficient operation in demanding environments like hydraulic fracturing ("fracking"), well servicing, and cementing operations.

Conventional high-pressure swivel joints typically comprise a spherical ball or raceway bearing system enclosed within a body that is sealed against fluid leakage. These joints are subjected to harsh conditions, including high pressures often exceeding 10,000 psi, abrasive fluids laden with sand or other particulates, temperature extremes, and mechanical shock loads. Over time, these stresses lead to degradation of internal components, including bearing surfaces, seals, and raceways. Wear of these components can result in fluid leakage, reduced rotation performance, increased torque requirements, and eventual failure if not properly maintained.

Regular maintenance and rebuilding are essential to extend the operational life of high-pressure swivel joints. Maintenance commonly includes disassembly, inspection, cleaning, lubrication, and replacement of seals and worn bearings. However, the rebuilding process is labor-intensive and requires specialized tools and skills to ensure proper reassembly and resealing of the joint. The sealing surfaces must often be resurfaced or replaced to restore full operational capability. Improper maintenance can lead to premature failures, creating operational downtime, increased costs, and safety risks.

Furthermore, traditional swivel joint designs offer limited capability for field maintenance; they often require that the joint be removed from service and sent to specialized repair facilities. This not only adds logistical complexity but also results in service interruptions. As such, there remains a need for high-pressure swivel joint designs that minimize maintenance burdens, enhance serviceability, extend operational life, and improve safety during high-pressure fluid handling operations.

SUMMARY

In one aspect, a pipe swivel assembly is provided for joining two pipes, wherein a first pipe can be connected to a first end of the swivel assembly, a second pipe can be connected to a second end of the swivel assembly, and a high pressure fluid can be carried through the swivel assembly from the first pipe to the second pipe. The swivel assembly comprises a body including an annular socket section with internal threads defining a central axis along the axial direction, an annular neck section having a smaller diameter than the socket section and extending axially away from the socket section to a first end, and an annular transition section extending between the socket section and the neck section to define a tapering throat having an internal sealing surface. The assembly further includes an inner bearing including a plurality of ball bearings configured in an annular arrangement, the inner bearing being disposed within the socket section contacting an axial face of the body adjacent to the throat. The assembly further includes a stem including an annular nose section having a tapering external surface, an annular stem barrel section extending axially away from the nose section to a second end, and a stem flange extending radially out from the stem barrel section adjacent the nose section. The nose section is positioned within the throat of the body at a predetermined distance from the internal sealing surface, and an axially-inner face of stem flange contacts the inner bearing. The assembly further includes an outer bearing including a plurality of ball bearings configured in an annular arrangement, the outer bearing being disposed around the stem barrel section and contacting an axially-outer face of the stem flange. The assembly further includes a locking collar including an annular collar barrel section with external threads and a collar flange extending radially outward from the collar barrel section. The collar barrel section is positioned around the stem barrel section of the stem, the external threads of the collar barrel section are threadingly engaged with the internal threads of the socket section of the body, and an axial end of the collar barrel section contacts the outer bearing. The assembly further includes a primary seal extending between the tapering nose section of the stem and the tapering internal sealing surface of the body. The stem can rotate around the central axis relative to the body without breaking the fluid tight seal between the stem and the body.

In one embodiment, the inner bearing consists of a first plurality of caged ball bearings without separate rings and the outer bearings consist of a second plurality of caged ball bearings without separate rings.

In another embodiment, a first raceway is formed on the axial face of the body adjacent to the throat, a second raceway is formed on the axially-inner face of the stem flange, a third raceway is formed on the axially-outer face of the stem flange, and a fourth raceway is formed on the axial end of the collar barrel section.

In still another embodiment, the pipe swivel assembly further comprises a plurality of torque features formed on the collar flange of the locking collar. The torque feature are at least one of: radial holes formed around the rim of the collar flange; notches formed around the rim of the collar flange; notches formed on the sides of the collar flange; and flat segments formed around the rim of the collar flange.

In yet another embodiment, the locking collar is a split collar comprising a plurality of arcuate sub-sections, and each sub-section includes a respective portion of the external threads.

In a further embodiment, the nose section of the stem includes a recessed primary seat for receiving the primary seal.

In a still further embodiment, the nose section of the stem further comprises a first secondary seat formed on a first side of the primary seat for receiving a first secondary seal and a second secondary seat formed on a second side of the primary seat for receiving a second secondary seal.

In a yet further embodiment, the nose section of the stem is angled such that its radially-outward surface is neither perpendicular nor parallel to the central axis, the sealing surface of the body is angled such that its radially-inward surface is neither perpendicular nor parallel to the central axis, and the recessed primary seat is angled such that its radially-outward surface is neither perpendicular nor parallel to the central axis.

In as still further embodiment, the primary seal is configured as a tapered annular shell.

In another embodiment, the pipe swivel assembly further comprises a threaded passage formed through the socket section radially adjacent to the collar barrel section of the locking collar. A set screw is threadingly engaged in the threaded passage and selectively extendible and retractable by screwing motion. When the set screw is extended to contact the collar barrel section, the locking collar cannot rotate relative to the body and when the set screw is retracted away from the collar barrel, the locking collar can rotate relative to the body.

In another aspect, a primary seal for a pipe swivel assembly is provided, wherein the pipe swivel assembly defines a central axis and includes a stem having an annular nose section centered on the central axis with a tapering outward surface, a body having an annular throat centered on the central axis with a tapering inward sealing surface, and wherein the nose section is positionable within the throat of the body at a predetermined distance from the internal sealing surface. The primary seal comprises a seal body configured as a tapered annular shell centered on a seal central axis, including a circular front edge with a first diameter and a circular, rear edge with a second diameter. The second diameter is greater than the first diameter, and the seal body is configured to be mountable on a surface of a nose section of a pipe swivel assembly with the seal central axis coincident with a central axis of the swivel assembly. The seal body has a radial thickness compressible from a free thickness to a predetermined distance between the nose section and an internal sealing surface of the swivel assembly.

In one embodiment, the primary seal further comprises a first annular rib extending radially inward from the seal body at a first axial position relative to the front edge of the seal. The first rib has a first radial length, a first axial width, and a first bottom end profile, The first annular rib is configured for insertion into a first locating groove formed in the nose section of the pipe swivel assembly.

In another embodiment, the primary seal further comprises a second annular rib extending radially inward from the seal body at a second axial position relative to the front edge of the seal. The second rib has, a second radial length, a second axial width, and a second bottom end profile. The second annular rib is configured for insertion into a second locating groove formed in the nose section of the pipe swivel assembly.

In still another embodiment, at least one of: a) the second radial length is different from the first radial length; b) the second axial width is different from the first axial width, and c) the second bottom end profile is different from the first bottom end profile.

In yet another embodiment, the primary seal further comprises a third annular rib extending radially inward from the seal body at a third axial position relative to the front edge of the seal. The third rib has a third radial length, a third axial width, and a third bottom end profile. The third annular rib is configured for insertion into a third locating groove formed in the nose section of the pipe swivel assembly.

In a further embodiment, at least one of: a) the third radial length is different from at least one of the first and second radial lengths; b) the third axial width is different from at least one of the first and second axial widths; and c) the third bottom end profile is different from at least one of the first and second bottom end profiles.

In still another aspect, a pipe swivel assembly is provided for joining two pipes, wherein a first pipe can be connected to a first end of the swivel assembly, a second pipe can be connected to a second end of the swivel assembly, and a high pressure fluid can be carried through the swivel assembly from the first pipe to the second pipe. The swivel assembly comprises a body including an annular socket section with internal threads defining a central axis along the axial direction, an annular neck section having a smaller diameter than the socket section and extending axially away from the socket section to a first end, and an annular transition section extending between the socket section and the neck section to define a tapering throat having an internal sealing surface. An inner bearing includes a plurality of ball bearings configured in an annular arrangement, the inner bearing being disposed within the socket section contacting an axial face of the body adjacent to the throat. A stem includes an annular nose section having a tapering external surface, an annular stem barrel section extending axially away from the nose section to a second end, and a stem flange extending radially out from the stem barrel section adjacent the nose section. The nose section includes an annular first locating groove formed in the radially-outward surface of the tapered exterior surface, the first locating groove having a first radial depth, a first axial width, and a first bottom end profile. The nose section is positioned within the throat of the body at a predetermined distance from the internal sealing surface. An axially-inner face of stem flange contacts the inner bearing. An outer bearing including a plurality of ball bearings is configured in an annular arrangement, the outer bearing being disposed around the stem barrel section and contacting an axially-outer face of the stem flange. A locking collar includes an annular collar barrel section with external threads and a collar flange extending radially outward from the collar barrel section. The collar barrel section is positioned around the stem barrel section of the stem. The external threads of the collar barrel section are threadingly engaged with the internal threads of the socket section of the body. An axial end of the collar barrel section contacts the outer bearing. A primary seal is mounted on the tapering nose section of the stem, the primary seal including a seal body positioned on radially-outward surface of the nose and extending radially the predetermined distance to the tapering internal sealing surface of the body. A first annular rib extends radially inward from the seal body at a first axial position relative to the front edge of the seal, the first rib having a first radial length, a first axial width, and a first bottom end profile. The first annular rib is received in the first locating groove of the nose, thereby holding the seal body in position on the nose. The stem can rotate around the central axis relative to the body without breaking the fluid tight seal between the stem and the body.

In one embodiment, the nose includes an annular second locating groove formed in the radially-outward surface of the tapered exterior surface, the second locating goove having a second radial depth, a second axial width, and a second bottom end profile. The primary seal includes a second annular rib extending radially inward from the seal body at a second axial position relative to the front edge of the seal, the second rib having a second radial length, a second axial width, and a second bottom end profile. The second annular rib is received in the second locating groove.

In another embodiment, at least one of: a) the second radial length of the second rib is different from the first radial length of the first rib; b) the second axial width of the second rib is different from the first axial width of the first rib; and
c) the second bottom end profile of the second rib is different
from the first bottom end profile the first rib nose.

BRIEF DESCRIPTION OF THE DRAWINGS

For a more complete understanding, reference is now made to the following description taken in conjunction with the accompanying Drawings in which:

FIG. 7 is a cross-sectional side view of an alternative embodiment of the stem of the pipe swivel assembly in accordance with another embodiment;

FIG. 8 is a cross-sectional side view of an alternative primary seal of the pipe swivel assembly in accordance with another embodiment.

DETAILED DESCRIPTION

Figure 1:
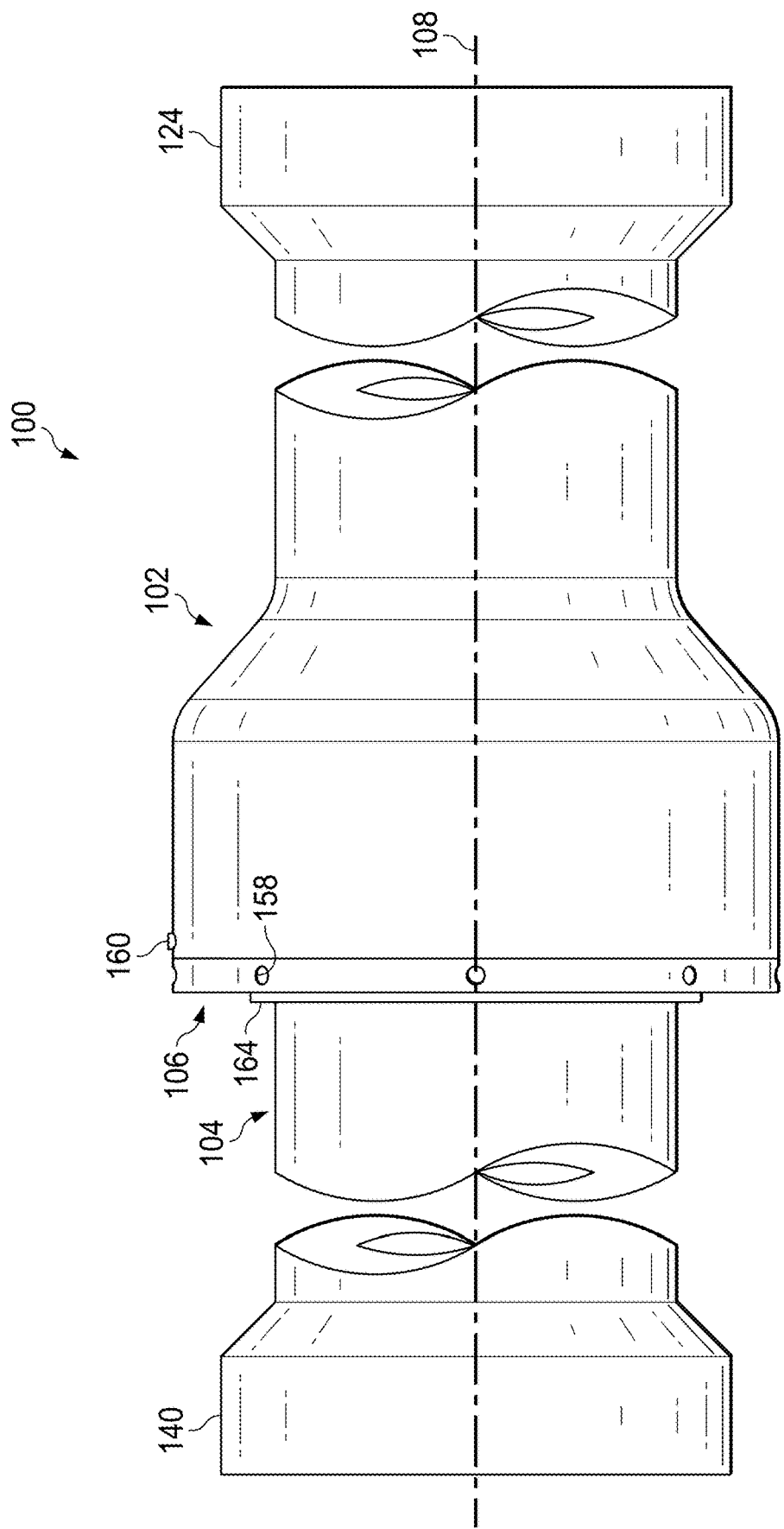
FIG. 1 is an external side view of a pipe swivel assembly in accordance with one aspect.

Referring now to the drawings, wherein like reference numbers are used herein to designate like elements throughout, the various views and embodiments of a high pressure pipe swivel assembly are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
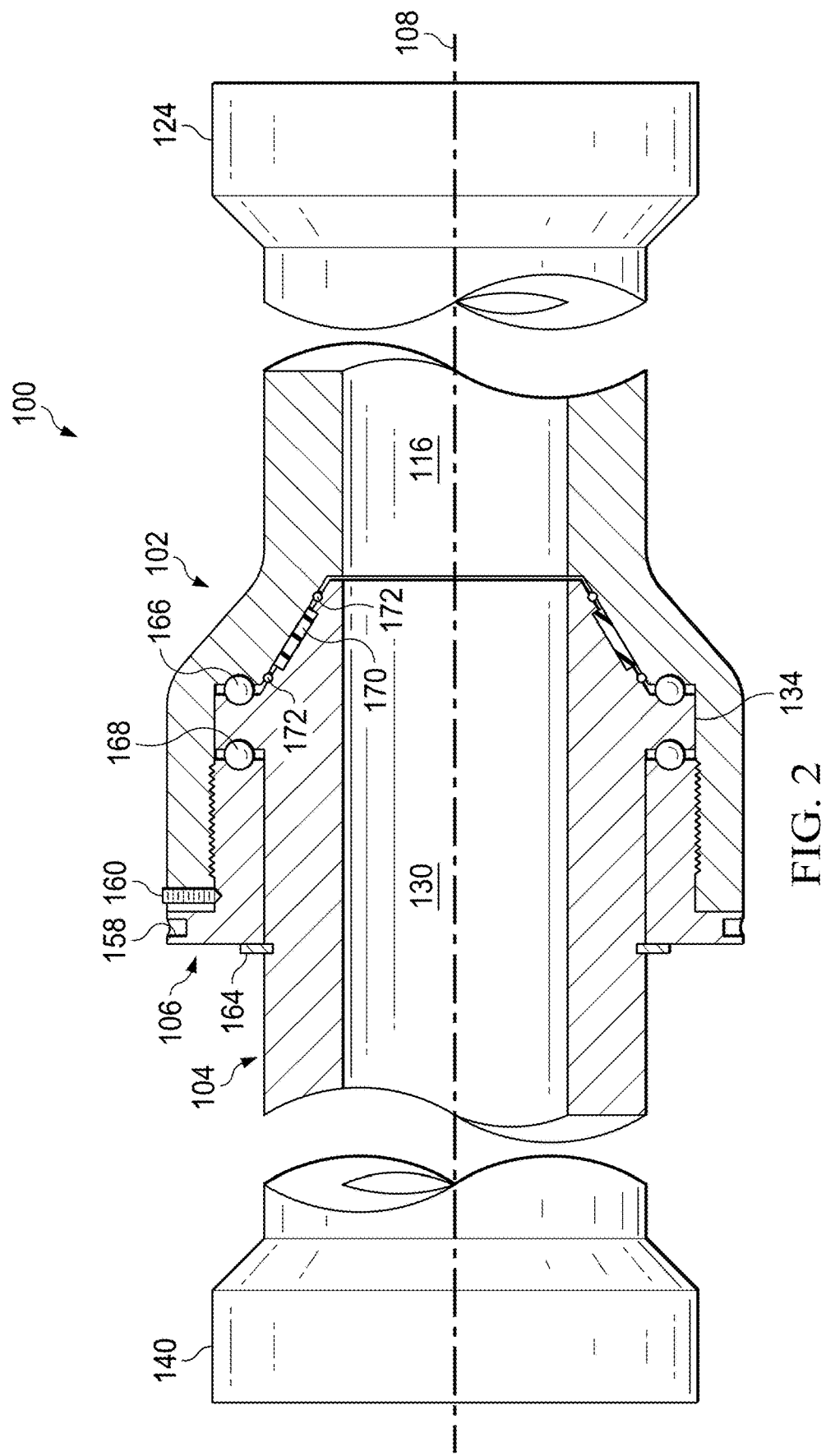
FIG. 2 is a cross-sectional side view of the pipe swivel assembly of FIG. 1.

Referring now to FIGS. 1 and 2, there is illustrated a pipe swivel assembly 100 in accordance with one aspect. The swivel assembly 100 includes a body 102, a stem 104, and a locking collar 106 arranged along a central axis 108. As further described herein, a portion of the stem 104 is positioned within the body 102 and held in place by engaging the locking collar 106 into the body around the stem. When thus engaged, the locking collar 106 prevents withdrawal of the stem 104 from the body 102 but allows the stem to rotate (i.e., "swivel") around the central axis 108 relative to the body. When the locking collar 106 is disengaged from the body 102, the stem 104 can be withdrawn from the body for inspecting and servicing the internal surfaces and components of the swivel assembly 100.

Unless otherwise stated, for purposes of this disclosure the terms "axial" and "axially" refer to directions parallel to the central axis 108 and the terms "radial" and "radially" refer to directions perpendicular to the central axis. Unless otherwise stated, for purposes of this disclosure the terms "axial-inward" and "axially-inward" refer to facing toward the neck section 110 of the body 102 and the terms "axial-outward" and "axially-outward" refer to facing away from the neck section of the body.

Figure 3A:
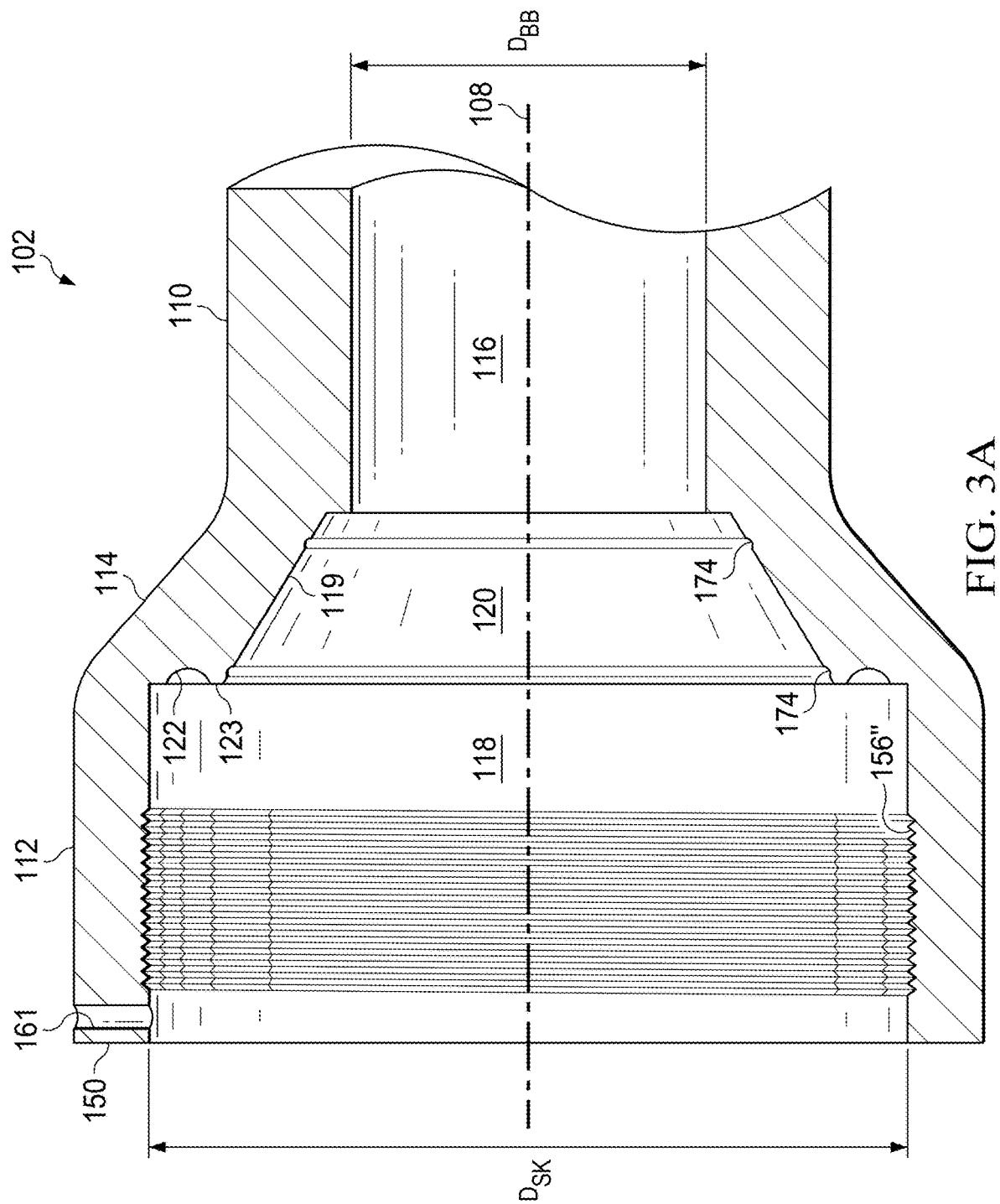
FIG. 3A is a cross-sectional side view of the body of the pipe swivel assembly.
Figure 3B:
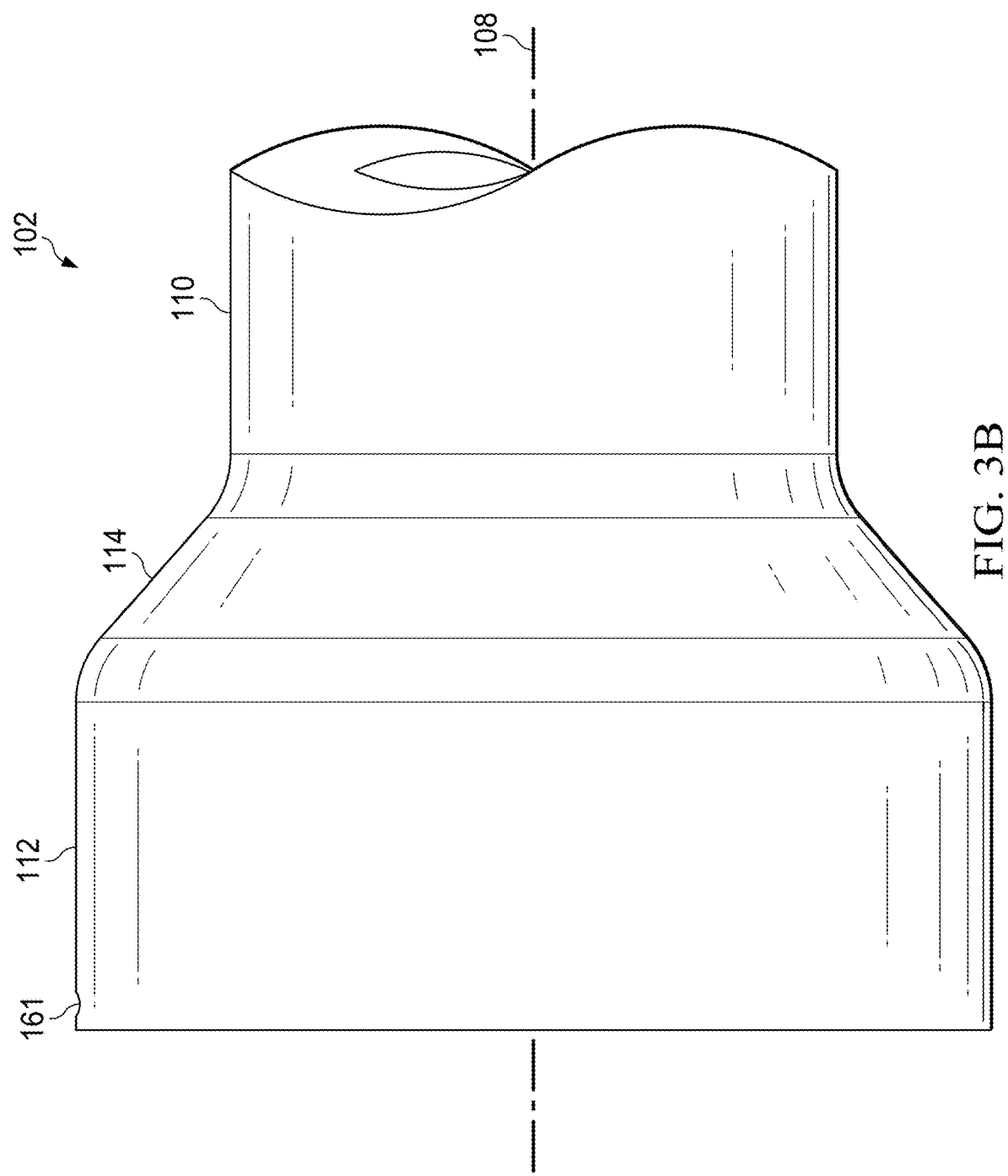
FIG. 3B is an external side view of the body of the pipe swivel assembly of FIG. 1.

Referring still to FIGS. 1 and 2, and now also to FIGS. 3A and 3B, the body 102 includes an annular neck section 110 connected on an inward side to an annular socket section 112 by a tapering annular transition section 114. The radially inner surface of the neck section 110 defines a body bore 116 that follows the central axis 108 and has a diameter $D_{BB}$. In most embodiments, the body bore diameter $D_{BB}$ is relatively constant. The radially inner surface of the socket section 112 defines a socket cavity 118 along the central axis 108 and has a diameter $D_{SK}$, where $D_{SK}$ is greater than $D_{BB}$. The radially inner surface of the transition section 114 forms a tapered sealing surface 119 that defines a throat 120 extending from the socket cavity 118 to the body bore 116 allowing fluid flow therebetween along the central axis 108. As further described herein, an inner bearing 166 (FIG. 2) is disposed between an axially-outward side 123 of the socket section 112 and the opposing (i.e., axially-inward) side 137 of the stem flange 134. In some embodiments, e.g., when the inner bearing 166 consists of a set of caged bearings without rings (i.e., races), the socket section 112 includes a socket raceway 122 (FIG. 4A) formed on the axially-outward surface 123, for example by machining. In other embodiments, e.g., when the inner bearing 166 comprises a full bearing assembly including bearings, a cage, and inner and outer bearing rings (where the rings include the raceways), the axially-outward surface 123 of the socket section 112 can include a groove, a shoulder or a mounting surface for receiving the inner bearing ring.

The neck section 110 is connected on an outward side to a body end connector 124 (FIGS. 1 and 2). In different embodiments, the outward portions of the neck section 110, body bore 116, and central axis 108 can be configured along a variety of different paths including, but not limited to, straight sections, long-radius 90 degree elbow sections, short-radius 90 degree elbow sections, and other curved sections of various angles and radii of curvature. Accordingly, for purposes of illustration in FIGS. 1 and 2, the outward portions of the neck section 110 are shown in broken line, and it will be understood that when the neck section has a curved configuration, the body bore 116 and the central axis 108 will be likewise curved. In different embodiments, the body end connector 124 can be configured in any industry standard pipe connection pattern including, but not limited to, hammer union style (e.g., FIG. 100, 1502), threaded end style (NPT, BSPT), flanged end style (e.g., ANSI, API, or custom), butt weld end style, grooved end style (e.g., Victaulic style), and clamp hub style (e.g., FIG. 207), to be selected on the basis of pressure rating, fluid type, installation type, and compatibility with existing fittings. In other embodiments, the body end connector 124 can be a second body 102 or stem 104. Accordingly, for purposes of illustration in FIGS. 1 and 2, the body end connector 124 is illustrated in dotted line.

Figure 4A:
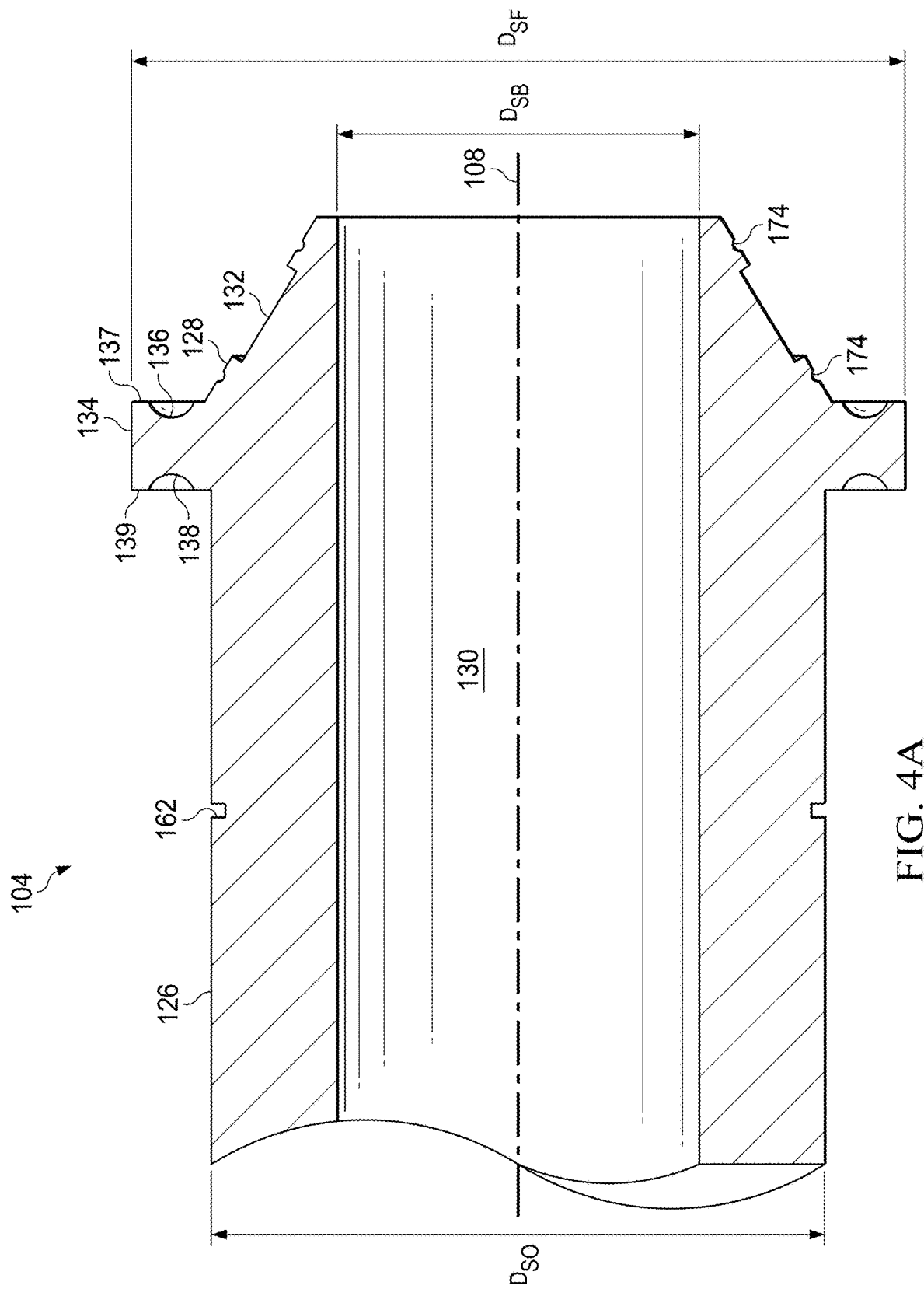
FIG. 4A is a cross-sectional side view of the stem of the pipe swivel assembly.
Figure 4B:
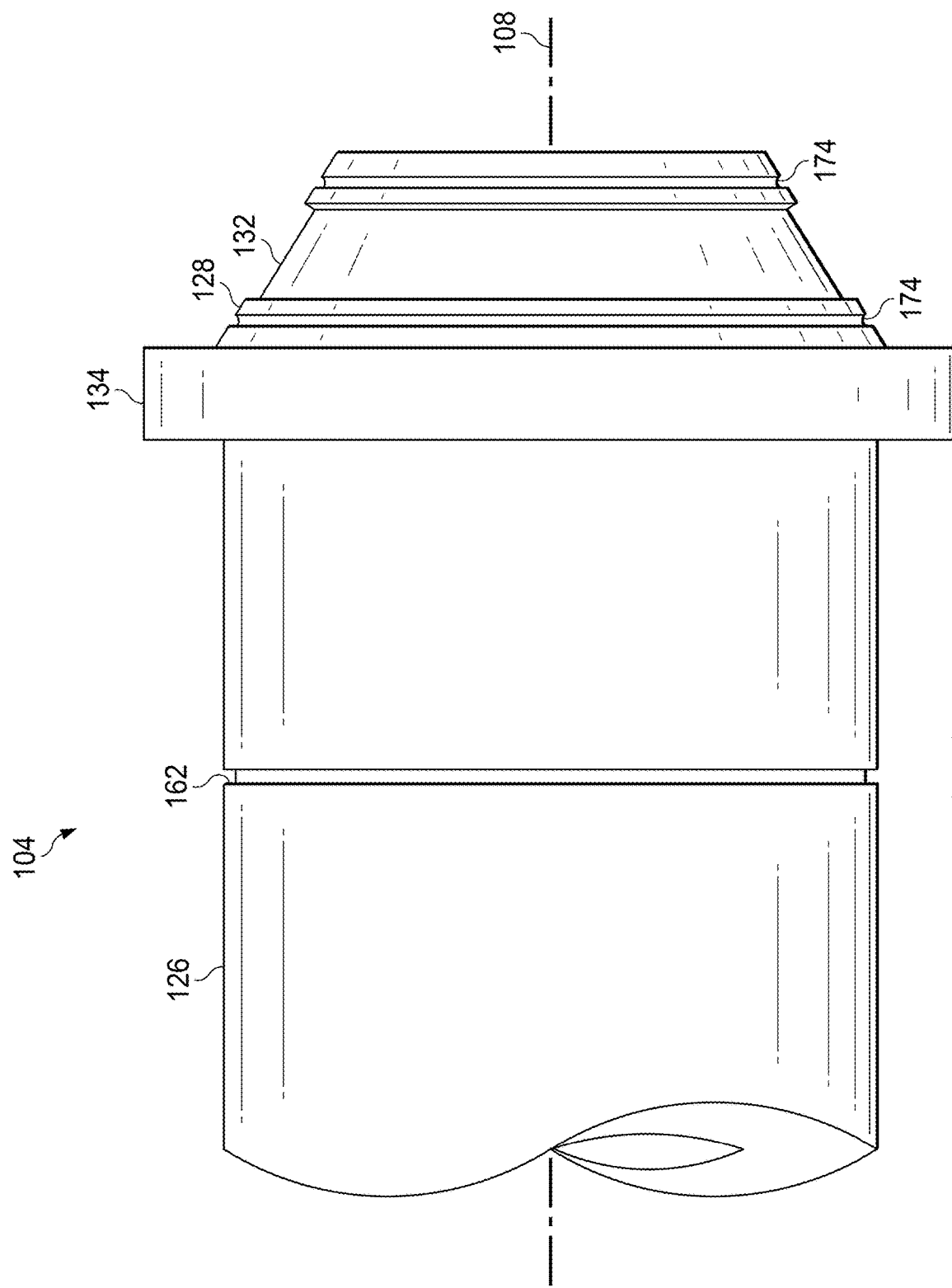
FIG. 4B is an external side view of the stem of the pipe swivel assembly of FIG. 1.

Referring still to FIGS. 1 and 2, and now further to FIGS. 4A and 4B, the stem 104 includes an annular stem barrel section 126 connected on an axially-inward side to a tapered annular nose section 128. The radially inner surfaces of the stem barrel section 126 and nose section 128 define a stem bore 130 that follows the central axis 108 and has a diameter $D_{SB}$ allowing fluid flow therethrough along the central axis 108. In most embodiments, the stem bore diameter $D_{SB}$ is relatively constant. In most embodiments, the stem bore diameter $D_{SB}$ is equal to the body bore diameter $D_{BB}$. The radially outer surface of the stem barrel section 126 defines the stem outer diameter $D_{SO}$. In most embodiments, the stem outer diameter $D_{SO}$ is relatively constant. In some embodiments the nose section 128 has a conical configuration. In some embodiments, the nose section 128 has a curved configuration including, but not limited to, spherical, ogive, ovoid, and parabaloid shapes. In most embodiments, the configuration profile of the nose section 128 is selected to match the configuration profile of the sealing surface 119 in the throat 120 of the body 102. The radially outer surface of the nose section 128 defines a recessed primary seat 132 configured to receive a primary fluid seal 170 (FIG. 2). In some embodiments, the primary seat 132 is angled with respect to the central axis 108. For purposes of this disclosure, the term "angled" used in regard to the primary seat 132 means the seat surface is neither parallel nor perpendicular to the central axis 108. The recessed aspect of the primary seat 132 helps retain the primary seal 170 in place on the nose section 128 during insertion of the stem 104 into the socket section 112. The recessed aspect of the primary seat 132 also helps prevent axial movement of the primary seal 170 when exposed to operating pressures. The recessed aspect of the primary seat 132 also allows the primary seal 170 to slide in the seat during swiveling without becoming displaced. Extending radially outward from the stem barrel section 126 adjacent to the nose section 128 is a stem flange 134. The stem flange 134 is configured for insertion into the socket cavity 118 of the body 102 and thus has an outer diameter, $D_{SF}$, less than $D_{SK}$.

As best seen in FIG. 2, the inner bearing 166 is disposed between the axially-outward side 123 of the socket section 112 and the opposing (i.e., axially-inward) side 137 of the stem flange 134 and an outer bearing 168 is disposed between the axially-outward side 139 of the stem flange and the opposing (i.e., axially-inward) side 154 of the collar barrel section 142. In some embodiments, e.g., when the inner bearing 166 consists of a set of caged bearings without rings (i.e., races), the stem flange 134 includes an inner raceway 136 (FIG. 4A) formed on the axially-inward surface 137, e.g., by machining. In other embodiments when the inner bearing 166 comprises a full bearing assembly including bearings, a cage, and inner and outer bearing rings (where the rings include the raceways), the axially-inward surface 137 of the stem flange 134 can include a groove, shoulder or mounting surface for receiving the outer bearing ring. Similarly, in embodiments where the outer bearing 168 consists of a set of caged bearings without rings, the stem flange 134 includes an outer raceway 138 (FIG. 4A) formed on the axially-outward surface 139. In other embodiments where the outer bearing 168 comprises a full bearing assembly including bearings, a cage, and inner and outer bearing rings, the axially-outward surface 139 of the stem flange 134 can include a groove, shoulder or mounting surface for receiving the inner bearing ring.

The stem barrel section 126 is connected on an outward side to a stem end connector 140 (FIGS. 1 and 2). In different embodiments, the outward portions of the stem barrel section 126, stem bore 130, and central axis 108 can be configured along a variety of different paths including, but not limited to, straight sections, long-radius 90 degree elbow sections, short-radius 90 degree elbow sections, and other curved sections of various angles and radii of curvature. Accordingly, for purposes of illustration in FIGS. 1 and 2, the outward portions of the stem barrel section 126 are shown in broken line, and it will be understood that when the stem barrel section has a curved configuration, the stem bore 130 and the central axis 108 will be likewise curved. In different embodiments, the stem end connector 140 can be configured in any industry standard pipe connection pattern including, but not limited to, hammer union style (e.g., FIG. 100, 1502), threaded end style (NPT, BSPT), flanged end style (e.g., ANSI, API, or custom), butt weld end style, grooved end style (e.g., Victaulic style), and clamp hub style (e.g., FIG. 207), to be selected on the basis of pressure rating, fluid type, installation type, and compatibility with existing fittings. In other embodiments, the stem end connector can be a body 102 or second stem 104. Accordingly, for purposes of illustration in FIGS. 1 and 2, the stem end connector 140 is illustrated in dotted line.

Figure 5A:
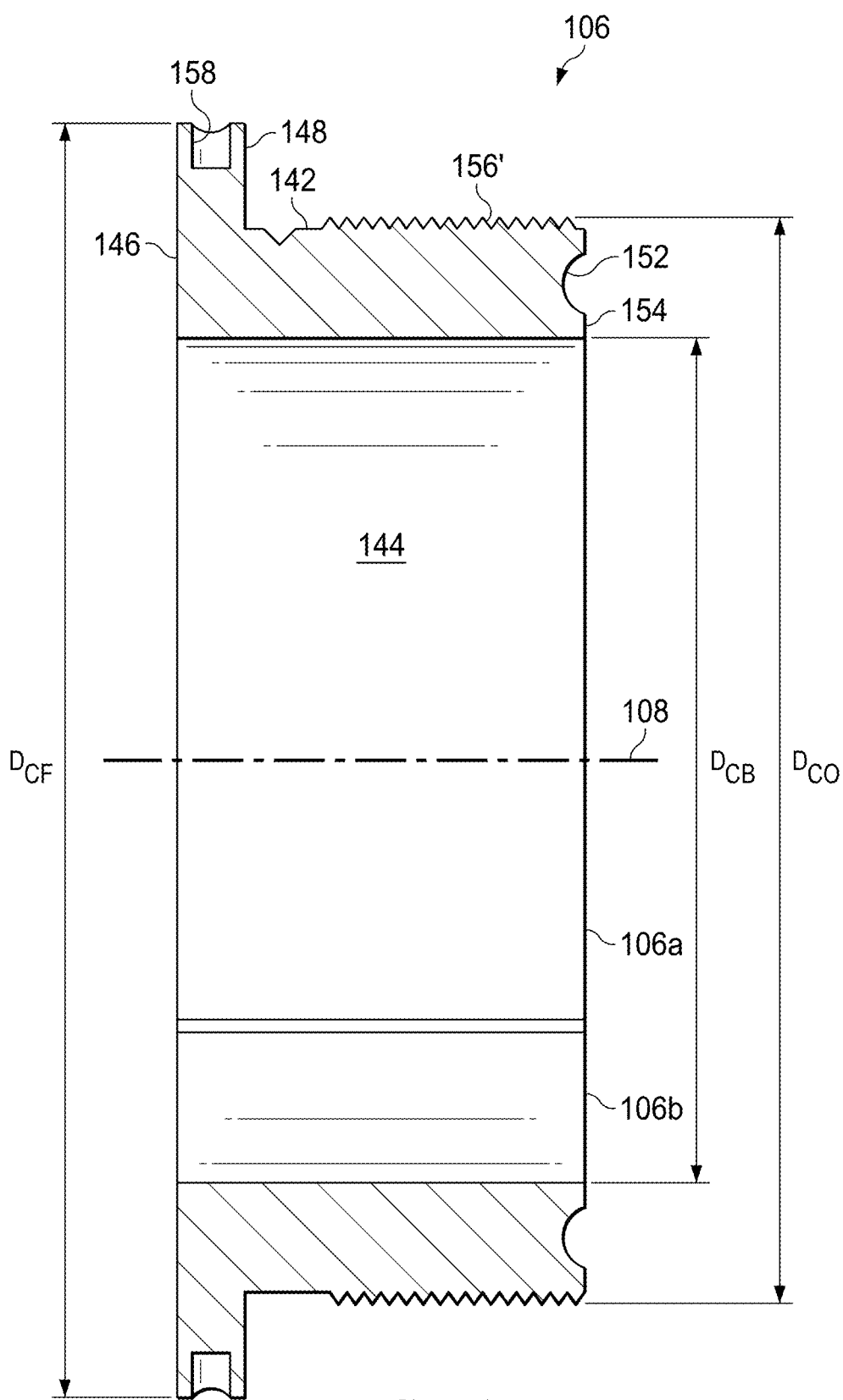
FIG. 5A is a cross-sectional side view of the locking collar of the pipe swivel assembly.
Figure 5B:
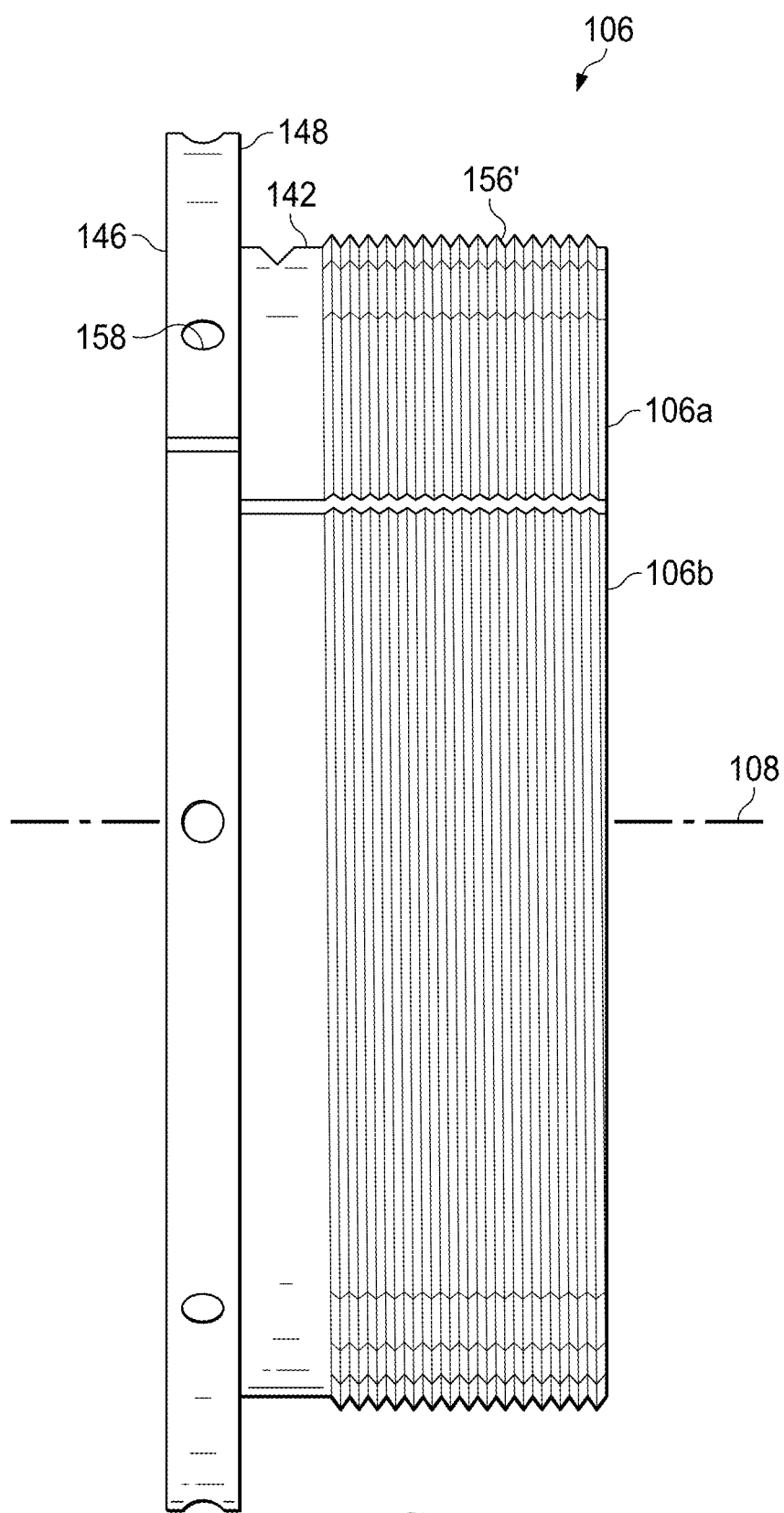
FIG. 5B is an external side view of the locking collar of the pipe swivel assembly of FIG. 1.

Referring still to FIGS. 1 and 2, and now further to FIGS. 5A and 5B, the locking collar 106 includes an annular collar barrel section 142 having a relatively constant inner diameter $D_{CB}$ and outer diameter $D_{CO}$ defining a collar bore 144 therethrough. The collar barrel section 142 is configured to fit over the stem barrel section 126, thus $D_{CB}$ is greater than $D_{SO}$. The collar barrel section 142 is also configured to fit within the socket cavity 118, thus $D_{CO}$ is less than $D_{SK}$. A collar flange 146 extends radially outward from the collar barrel section 142 to a diameter DCF greater than $D_{SK}$ such that at least a portion of an axially-inward face 148 of the collar flange 146 overlaps radially with at least a portion of an axially-outward face 150 of the body 102. As previously described herein, the outer bearing 168 is disposed between the axially-inward side 154 of the collar barrel section 142 and the opposing (i.e., axially-outward) side 139 of the stem flange 134. In some embodiments, e.g., when the outer bearing 168 consists of a set of caged bearings without rings, the collar barrel section 142 includes a collar raceway 152 (FIG. 5A) formed on the axially-inward surface 154. In other embodiments, e.g., when the outer bearing 168 comprises a full bearing assembly comprising bearings, a cage, and inner and outer bearing rings, the axially-inward surface 154 of the collar barrel section 142 can include a groove, shoulder or mounting surface for receiving the outer bearing ring.

The radially outer surface of the collar barrel section 142 and the radial inner surface of the socket section 112 are configured with mutually interlocking engagement features 156' and 156". In the illustrated embodiment, the engagement features comprise exterior threads 156' on the collar barrel section 142 and internal threads 156" on the socket section 112, thereby allowing the collar barrel section of the collar 106 to be selectively engaged and disengaged with the socket section of the body 102 (i.e., by screwing and unscrewing). In other embodiments, the mutually interlocking engagement features 156' and 156" can have other known configurations for locking and unlocking annular elements to one another including, but not limited to, bayonet lock, key and keyway, cam lock, lug-and-slot.

In some embodiments, the collar 106 is a one-piece element, whereas in other embodiments, the collar 106 is a split collar comprising two or more arcuate subsections 106a, 106b combined during assemblage of the swivel assembly 100. A split collar 106 has the advantage of being usable when the stem end connector 140 is too large for a single-piece collar to pass over or where the stem barrel section 126 is too curved to allow a single-piece collar to pass. To utilize a split collar, the arcuate subsections 106a, 106b, etc. are held together around the stem barrel section 126 until their respective engagement features 156' collectively engage the complimentary engagement features 156" the socket section 112. In some embodiments, the split collar can be initially fabricated as a single piece collar 106, e.g., to allow convenient forming of the collar flange 146 and cutting of the threads 156', and then that single piece collar can be cut into separate subsections 106a, 106b, etc. In other embodiments, the split collar subsections 106a, 106b, etc. can be formed from initially separate elements.

In some embodiments, the locking collar 106 includes one or more torque features 158 formed on the collar flange 146 to facilitate tightening and loosening of the locking collar 106 into the socket section 112 of the body 102. In the illustrated embodiment, the torque features 158 comprise radial holes formed around the collar flange 146 configured for tightening with a tool, e.g., a pin spanner wrench. In other embodiments, the torque features 158 comprise notches formed around the collar flange 146 configured for tightening with a tool, e.g., a hook spanner wrench. In still other embodiments, the torque features 158 comprise flat segments ("flats") formed around the periphery of the collar flange 146 (i.e., similar to a nut) configured for tightening with a tool, e.g., an adjustable wrench. In some embodiments, a set screw 160 can be inserted through a passage 161 in the socket section 112 to engage the collar barrel section 142 to prevent the collar 106 from inadvertently moving relative to the body 102. In some embodiments a collar ring groove 162 is formed in the exterior surface of the collar barrel section 142 at a position that is adjacent to the axial-outer end of the collar 106 when the collar is fully engaged in the socket section 112. The collar ring groove 162 is configured to accept a collar ring 164 after the collar 106 is fully engaged in the socket section 112 of the body 102. The collar ring 164 prevents dirt and other foreign materials from entering the annular space between the collar 106 and the stem 104. In some embodiments the collar ring 164 is a split ring. In other embodiments the collar ring 164 is a spiral ring.

As best seen in FIG. 2, the pipe swivel assembly 100 further comprises an inner bearing 166, an outer bearing 168, and a primary seal 170. The inner bearing 166 is disposed between the socket section 112 (e.g., face 123) and the stem flange 134 and has an annular configuration allowing fluid flow between the body bore 116 and the stem bore 130. The inner bearing 166 rotates about the central axis 108 and is configured for loading parallel to the central axis (i.e., as a thrust bearing) when the stem 104 is pushed against the body 102. In some embodiments, the inner bearing 166 is a set of caged ball bearings (for clarity, the cages surrounding the individual ball bearings are not shown in FIG. 2) without rings disposed between the socket raceway 122 (FIG. 3A) of the socket section 112 and the inner raceway 136 (FIG. 4A) of the stem flange 134. In other embodiments, the inner bearing 166 is a complete ball bearing assembly comprising a set of ball bearings, a cage, and inner and outer rings disposed between the axial socket face 123 and the stem flange inner face 134.

The outer bearing 168 is disposed between the locking collar 106 (e.g., face 154) and the stem flange 134 and has an annular configuration allowing fluid flow between the body bore 116 and the stem bore 130. The outer bearing 168 rotates about the central axis 108 and is configured for loading parallel to the central axis (i.e., as a thrust bearing) when the locking collar 106 is pushed against the stem 104. In some embodiments, the outer bearing 168 is a set of caged ball bearings (for clarity, the cages surrounding the individual ball bearings are not shown in FIG. 2) without rings positioned between raceways 138, 152 on the respective stem 104 and locking collar 106 as previously described. In other embodiments, the outer bearing 168 is a complete ball bearing assembly comprising a set of ball bearings, a cage, and inner and outer rings disposed between the stem flange outer face 139 and the collar barrel face 154.

In some embodiments, the outer bearing 168 is a split bearing having two or more arcuate subsections 168a, 168b, etc., similar to a split collar. In a split outer bearing 168, each subsection 168a, 168b, etc. can have a respective subset of ball bearings (or roller or needle bearings as applicable), a respective cage segment and respective ring segment. Use of a split outer bearing 168 facilitates installation, removal, and replacement of the outer bearing over stem barrel section 126 and stem end connection 140.

In the swivel assembly 100, each row of bearings (e.g., inner bearing 166 is one row, outer bearing 168 is another row, etc.) is axially offset along the central axis 108 from the other rows, and each pair of raceways (whether directly machined or part of a ring) contacting a particular row are also axially offset from one another. For example, in the illustrated embodiment, the first pair of raceways 122, 136 pressing against opposite axial sides of the inner bearing 166 are axially offset from one another, and the second pair of raceways 138, 152 pressing against opposite axial sides of the outer bearing 168 are axially offset from one another, as well as axially offset from the first pair. In contrast, in a conventional swivel assemblies (e.g., Chiksan® style), each row of ball bearings is axially offset along the central axis from the other rows, but each pair of raceways contacting a particular row of ball bearings are radially offset (i.e., in a direction perpendicular to the central axis) from one another. In other words, one raceway of the pair is positioned on the radially-inward side of the bearings and presses on a first axial side of the bearings, and the other raceway of the pair is placed on the radially-outward side of the bearings and presses on the opposite axial side of the bearings.

In other embodiments of the pipe swivel assembly 100, the inner bearing 166 and/or the outer bearing 168 can be a roller bearing, needle bearing, or other form of thrust bearing rather than a ball bearing as illustrated. In such cases where the bearing configuration of the inner and outer bearings 166, 168 are changed, corresponding changes will be required to the configuration of the raceways 122, 136, 138, and 152. Alternatively, in embodiments of the pipe swivel assembly 100 using separate rings or integrated bearing assemblies (with bearings, cages and rings) modification may be required to the mounting slots or grooves on the faces of the socket section 112, stem flange 134 and locking collar 106.

The primary seal 170 is mounted in the primary seat 132 of the nose section 128 and forms a fluid-tight seal against the sealing surface 119 when the nose section 128 is positioned at the predetermined distance from the throat 120 by fully engaging the locking collar 106 against the socket 112. The primary seal 170 can be configured as a tapered annular shell having a seal central axis 178 that is coaxial with the central axis 108 of the swivel assembly. In the illustrated embodiment, the primary seal 170 is configured as a truncated conical shell centered on the seal central axis 178, wherein the shell has a rectangular cross section that is angled with respect to the seal central axis. The conical shell is similar to a cylindrical shell, but with slanted sides (tapered), so instead of being radially bounded by inner and outer cylinders, it's radially bounded by inner and outer cones, where the inner cone is a revolution of the surface of the primary seat 132 and the outer cone is a revolution of the sealing surface 119 (both revolutions being around the central axis 108). In other embodiments, the cross section of the primary seal 170 may be trapezoidal or tapering instead of rectangular, but overall still forming a tapered annular shell. In still other embodiments, e.g., where the cross-sections of the nose section 128 and sealing surface 119 are curved instead of straight, the primary seal 170 can be configured as a different type of tapered annular shell. For example, if the nose section 128 and sealing surface 119 (i.e., viewed in cross section) each form a parabolic curve, the primary seal 170 can be configured as truncated paraboloidal shell. For another example, if the nose section 128 and sealing surface 119 (i.e., viewed in cross section) each form a toroidal curve, the primary seal 170 can be configured as truncated toroidal shell. In still further embodiments, the cross section of the primary seal 170 can have a convex radially-outward surface and a concave radially-inward surface forming an overall tapered annular shell around the seal central axis 178.

Put another way, the primary seal 170 has a circular front edge centered on the seal central axis 178 and a circular rear edge also centered on the seal central axis but axially spaced apart from the forward edge, wherein the front edge defines a first diameter and the rear edge defines a second diameter that is greater than the first diameter due to the tapered configuration of the seal. When installed between the nose 128 (or 228 in FIG. 7) and the sealing surface 119 of the throat 120, the primary seal 170 will have its seal central axis 178 coincident with the central axis 108 of the swivel assembly, and its front edge will be positioned axially-inward along the central axis relative to its rear edge.

The primary seal 170 is configured to resiliently deform between a first radial thickness when the primary seal is in an uncompressed state to a second radial thickness when the primary seal is fully compressed between the primary seat 132 and the sealing surface 119 to a predetermined distance by tightening the locking collar 106 against the socket 112. The first thickness of the primary seal 170 (also called the "free" thickness or uncompressed thickness) is selected to be greater than the predetermined distance between the primary seat 132 and the sealing surface 119 (i.e., when the swivel assembly 100 is tightened together) by an amount large enough that, under subsequent compression to the thickness of the predetermined distance, it will resist fluid leakage past the primary seal under the expected operating pressure, but not so large that, under subsequent compression to the thickness of the predetermined distance, it will cause a rupture of the primary seal.

The primary seal 170 seal can be made of an elastomeric or polymeric material selected to be compatible with the fluids and service pressures anticipated for the swivel assembly. Since the angled primary seat 132 is neither parallel nor perpendicular to the central axis 108, the primary seal 170 mounted in the seat can be substantially longer in the axial direction than its thickness in the radial direction, thereby providing substantially more sealing area compared to seals of conventional configuration (i.e., those mounted either parallel or perpendicular to the central axis).

In some embodiments, the swivel assembly 100 is configured such that the primary seal 170 will be optimally loaded against the sealing surface 119 and the inner and outer bearings 166 and 168 will be optimally loaded between their respective pairs of raceways 122, 136 and 138, 152 when the locking collar 106 is engaged into the body 102 until its axially-inward face 148 meets the axially-outward face 150 of the socket section 112.

In some embodiments, the swivel assembly 100 further comprises one or more secondary seals 172 that are positioned on the nose section 128 and form secondary fluid-tight seals against the sealing surface 119 when the nose section 128 is pressed into the throat 120. In some embodiments, the secondary seals 172 can be O-rings, whereas in other embodiments, the secondary seals can be flat seals. Secondary seats 174 (FIGS. 3A, 4A) can be provided on the nose section 128 and/or the sealing surface 119 to hold the secondary seals in position. In the illustrated embodiment, the secondary seals 172 are placed on each side of the primary seal 170 to protect the primary seal from dirt or fluids moving along the interface between the throat section 120 and the nose section 128. The secondary seals 172 can be made of an elastomeric or polymeric material selected to be compatible with the fluids and service pressures anticipated for the swivel assembly. In some embodiments, the secondary seals 172 can be formed of the same material as the primary seal 170, but this is not required. Since the secondary seals 172 are primarily to protect the primary seal 170 from contamination, a material of relatively higher durometer or relatively higher hardness (i.e., compared to the durometer/hardness of the primary seal) can be used for the secondary seals in some embodiments.

The disclosed pipe swivel assembly 100 is very rugged, yet simple and quick to disassemble and reassemble for service in the field. In contrast, conventional pipe swivel assemblies (e.g., Chiksan® style) using individual loose ball bearings, are tedious and time consuming to disassemble and reassemble, thus service is typically done in a depot rather than in the field.

To disassemble the pipe swivel assembly 100, the collar ring 164 (if present) is removed from the collar ring groove 162 and set aside. Also, the set screw 160 (if present) is removed from the body passage 161 and set aside or loosed sufficiently to allow rotation of the locking collar 106. Next, the locking collar 106 is disengaged from the socket section 112 of the body 102 by unscrewing the threads 156' and 156" (or otherwise disconnecting the interlocking engagement features 156' and 156" if a different configuration is used). If necessary, a suitable wrench or bar can be inserted into the holes 158 (or other torque features 158) of the collar flange 146 to facilitate separating the locking collar 106 from the body 102. If the locking collar 106 is a split collar, the acuate subsections 106a, 106b, etc. can be separated after the collar is withdrawn from the socket section 112 and set aside. After the locking collar 106 is removed, the entire stem section 104 can be pulled axially out of the body 102. The outer bearing 168 will come out with stem 104. If the outer bearing 168 is a split bearing, the bearing subsections 168a, 168b, etc. can be removed. Upon withdrawal of the stem 104, the inner bearing 166, primary seal 170, and secondary seals 172 (if present) may come out or may stay in the throat section 120 or socket section 112, e.g., stuck with grease, dirt or other residue. However, since the socket section 112 is very accessible after withdrawal of the stem 104, any remaining components 166, 170, and 172 can be easily removed from the socket section with an ordinary tool such as screwdriver or pliers. At this point, disassembly of the pipe swivel assembly 100 is complete.

After disassembly of the pipe swivel assembly 100 is disassembled, the various components can be cleaned and inspected. All of the bearing raceways 122, 136, 138, and 152 can be visually inspected without the need for mirrors or fiber-optic scopes. The seats 132 and 174 on the nose section 128 can be visually inspected and gauged for tolerances without the need for mirrors or fiber-optic scopes. The ball bearings and cages of the inner and outer bearings 166, 168 can be visually inspected, gauged for tolerances and replaced if necessary. The primary seal 170 and secondary seals 172 are preferably replaced after each disassembly, but can be reused if inspection indicates they are in acceptable condition.

To reassemble the pipe swivel assembly 100, the primary seal 170 and secondary seals 172 are first mounted on the nose section 128. Next, the inner bearing 166 is mounted against the axially-inward face of the stem flange 134 and the outer bearing 168 is mounted against the axially outward-face of the stem flange. If the outer bearing 168 is a split bearing, the subsections 168a, 168b, etc. are held around the stem barrel section 126 to form the complete locking outer bearing. The nose section 128 and stem flange 134 carrying the seals and bearings are then inserted into the socket section 112, preferably until the primary seal 170 contacts the sealing surface 119. If the locking collar 106 is a split collar, the subsections 106a, 106b, etc. are held around the stem barrel section 126 to form the complete locking collar. Next the threads 156' of the locking collar 106 are screwed into the threads 156" of the socket section 112 until the collar flange 146 butts against the axially-outward face 150 of the body 102 (or until a predetermined torque setting is reached to signify that the bearings 166 and 168 are properly compressed between their respective raceways 122, 136 and 138, 152. Next, the set screw 160 can be inserted into the passage 161 of the body 102 and tightened against the locking collar 106. Lastly, the collar ring 164 can be replace in the collar ring groove 162. At this point, reassembly of the pipe swivel assembly 100 is complete.

Figure 6A:
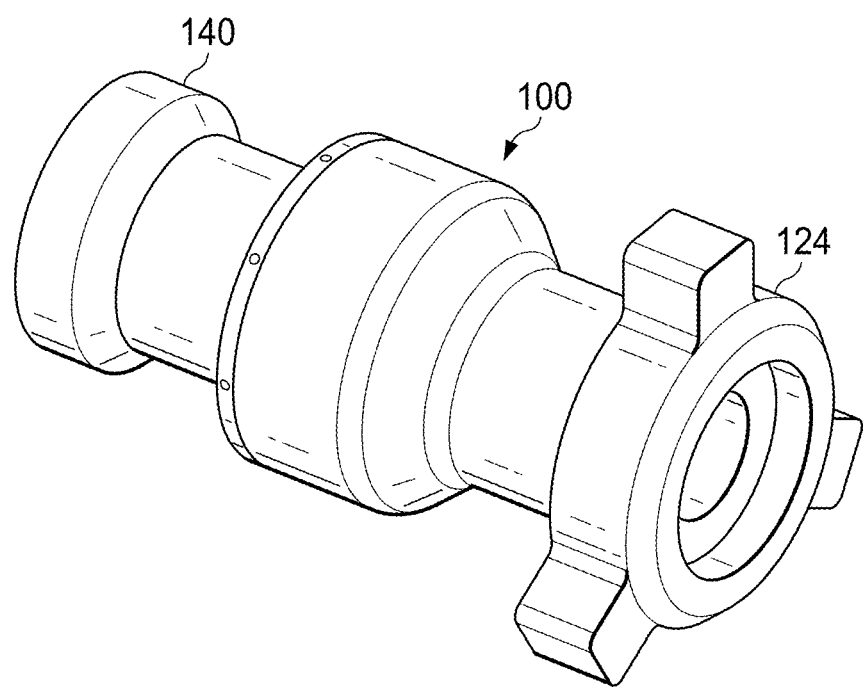
FIGS. 6A-6F are external views of possible configurations for pipe swivel assemblies in accordance with additional aspects.
Figure 6B:
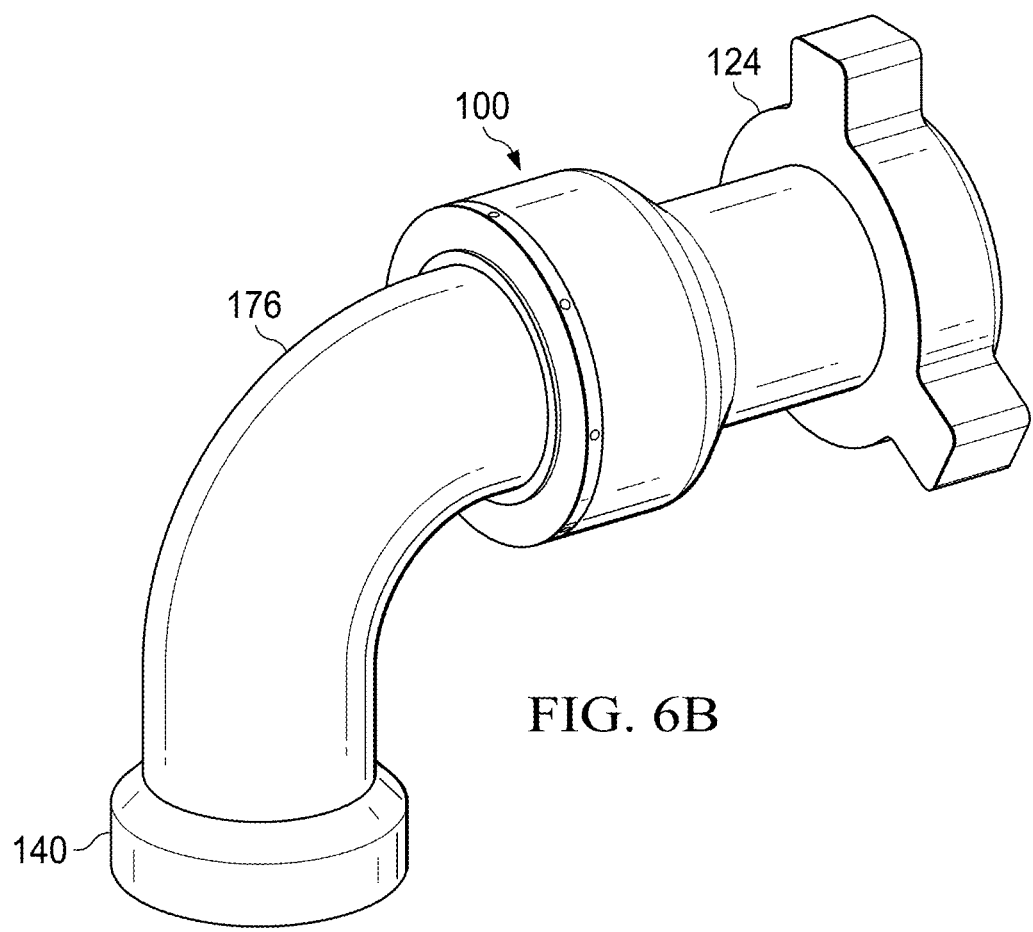
Figure 6C:
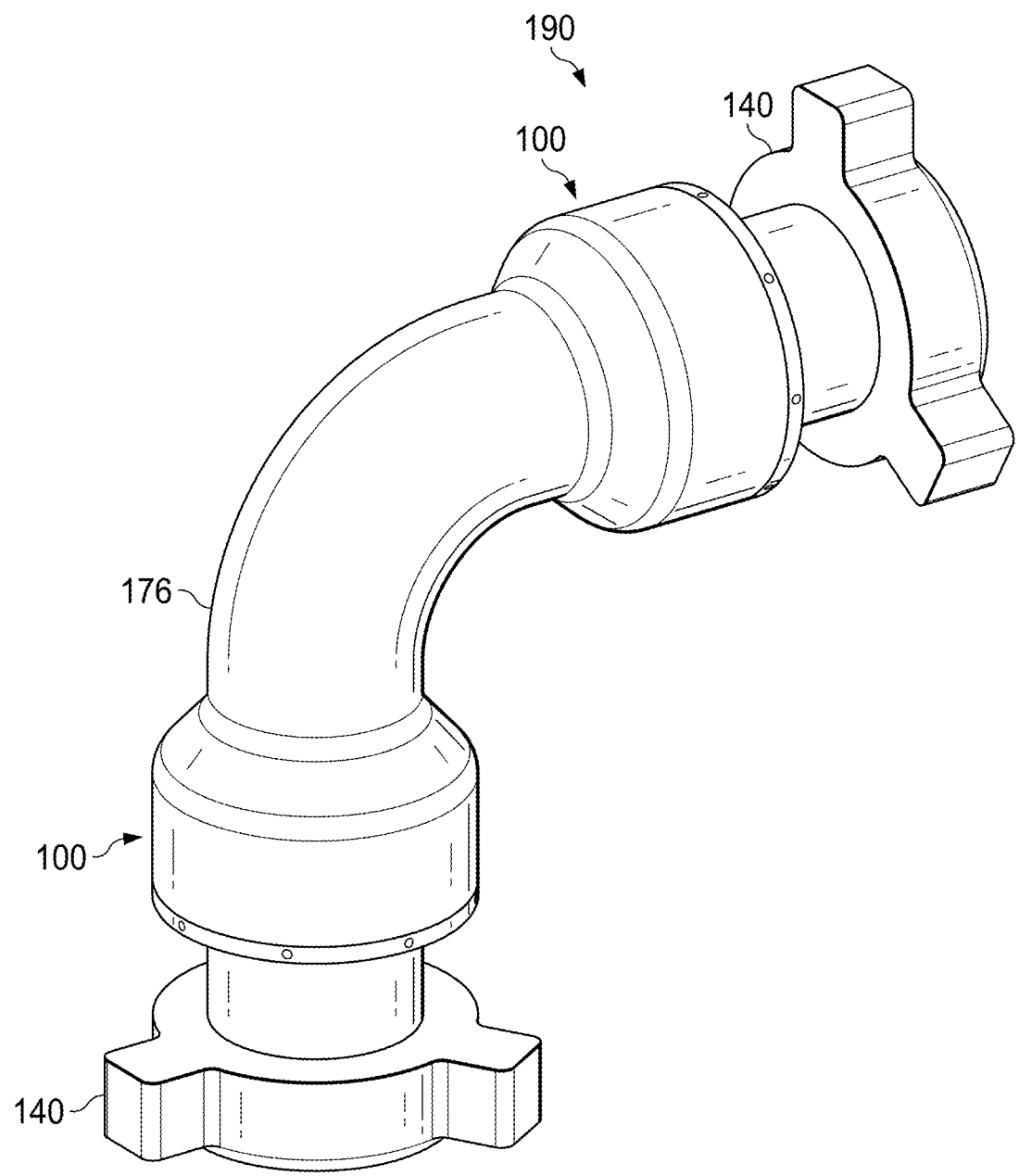
Figure 6D:
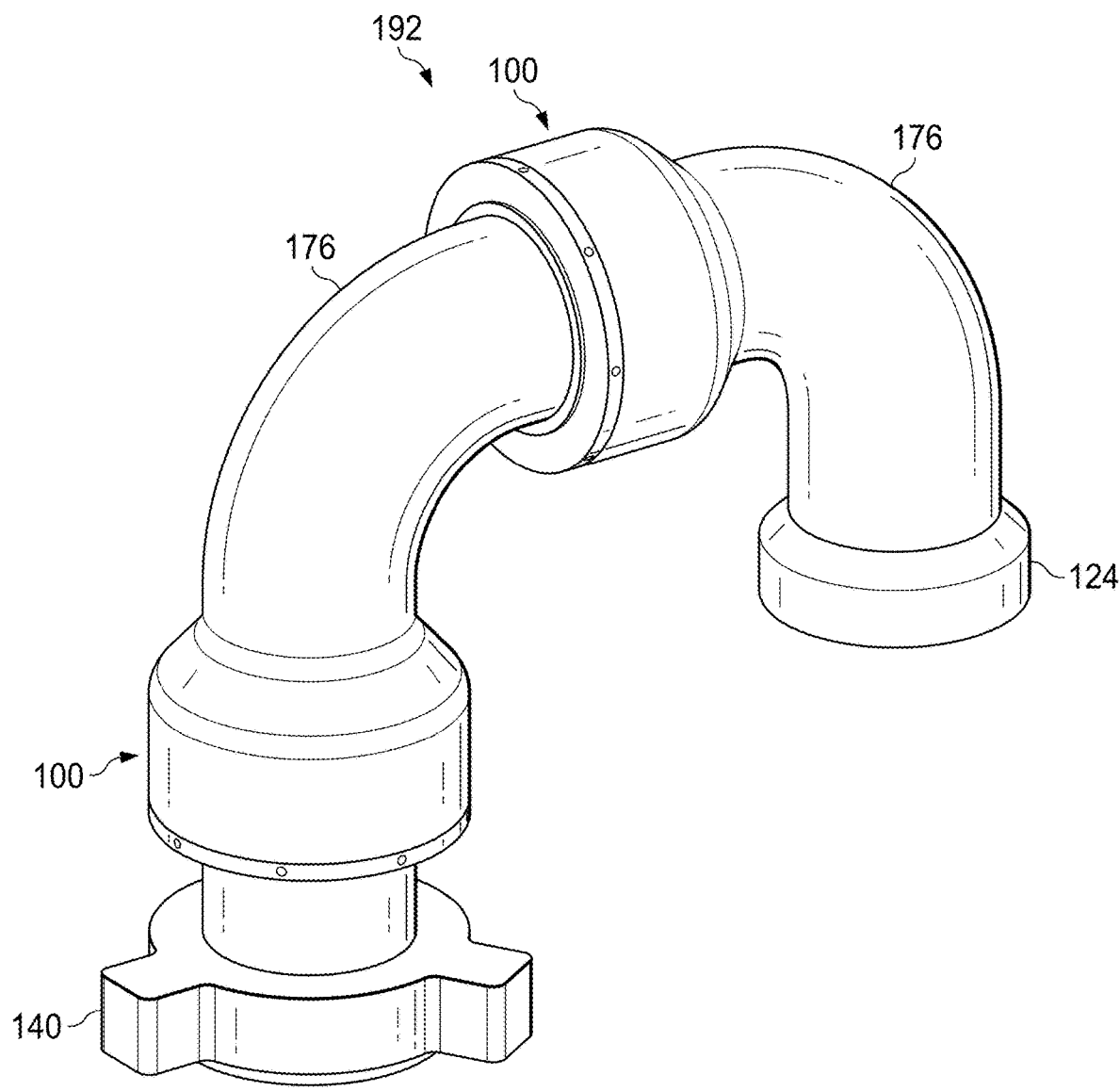
Figure 6E:
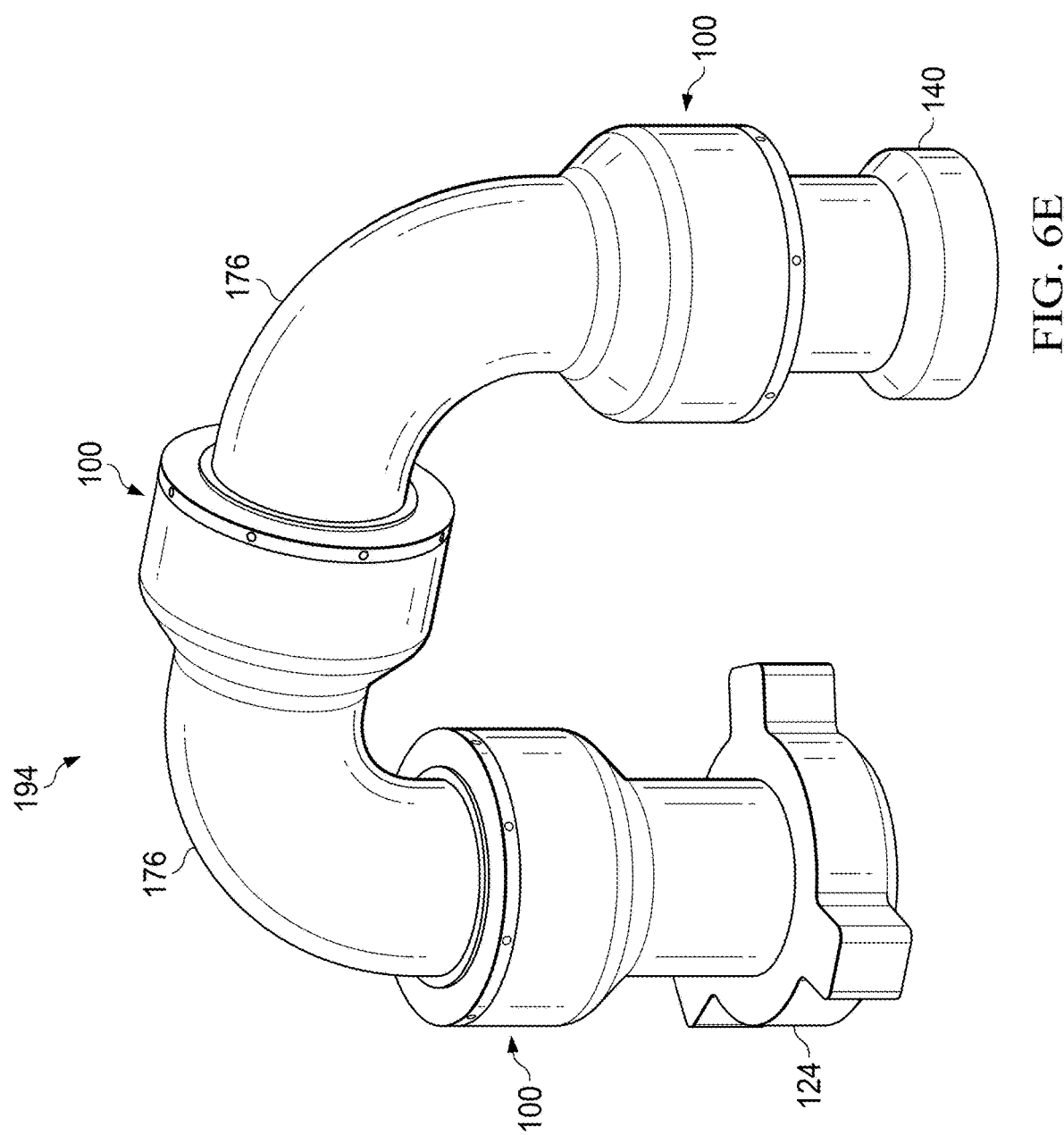
Figure 6F:
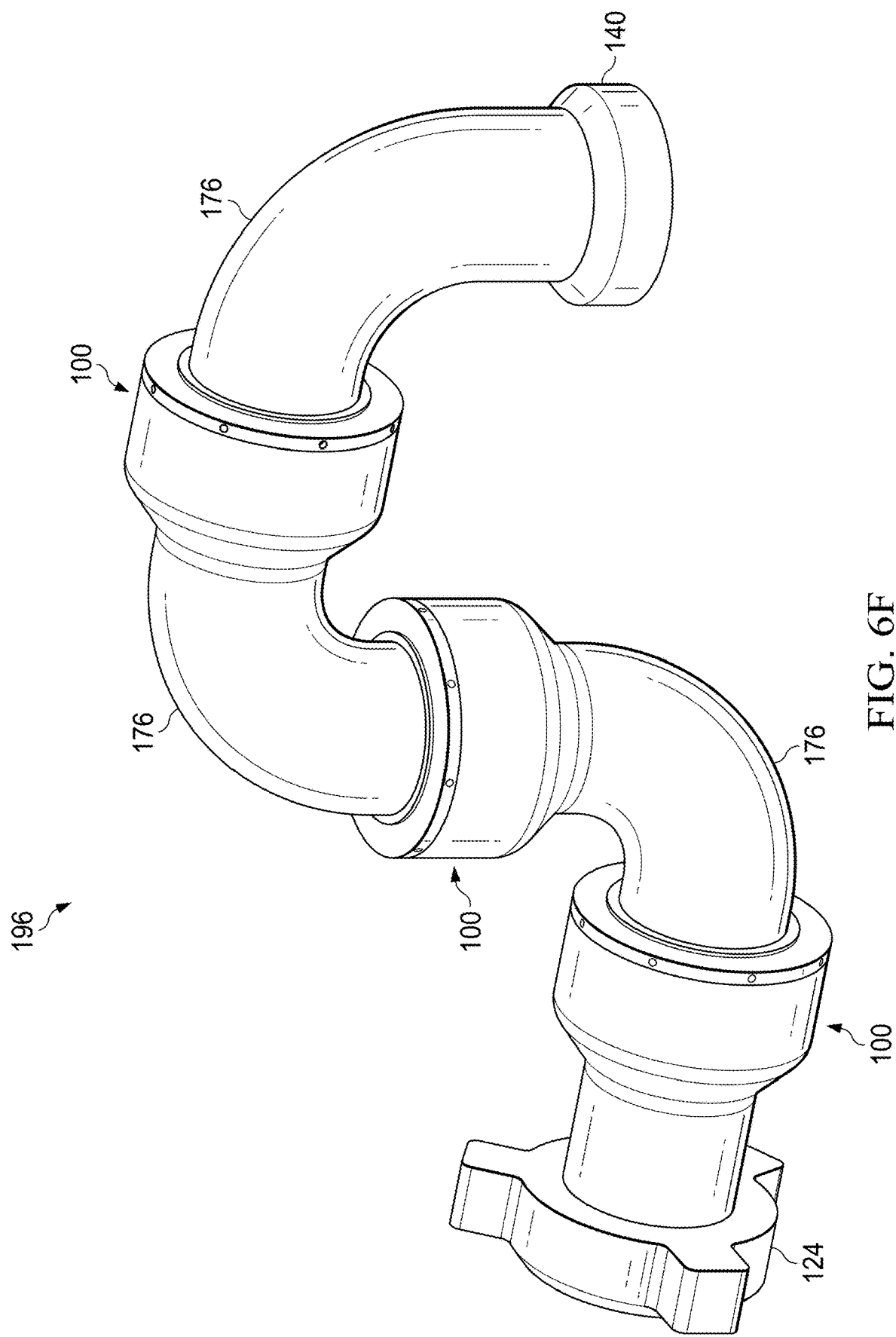

Referring now to FIGS. 6A-6F, the pipe swivel assembly 100 can be used as the basis for many different pipe swivel types. FIGS. 6A and 6B illustrate pipe swivels using a single pipe swivel assembly 100, wherein the assembly of FIG. 6A has a neck section and a stem barrel section that are straight, and wherein the assembly of FIG. 6B has a stem barrel section that includes an elbow 176. FIGS. 6C through 6F illustrate swivels using multiple swivel assemblies 100 to make more complex swivels including, but not limited to: a swivel type 190 using two swivel assemblies with one elbow and F-F end connectors (FIG. 6C); a swivel type 192 using two swivels assemblies with two elbows and M-F end connectors (FIG. 6D); a swivel type 194 using three swivel assemblies with two elbows and M-F end connectors (FIG. 6E); and a swivel type 196 using three swivel assemblies with three elbows and M-F end connectors (FIG. 6F). It will be appreciated that the configurations shown in FIGS. 6A-6F are not exhaustive, and many other combinations can be formed falling within the scope of this disclosure. Further, in the illustrated embodiments, the end connectors 124, 140 are of the hammer union type, however, it will be appreciated that other end connector patterns can be used in other embodiments.

Figure 9:
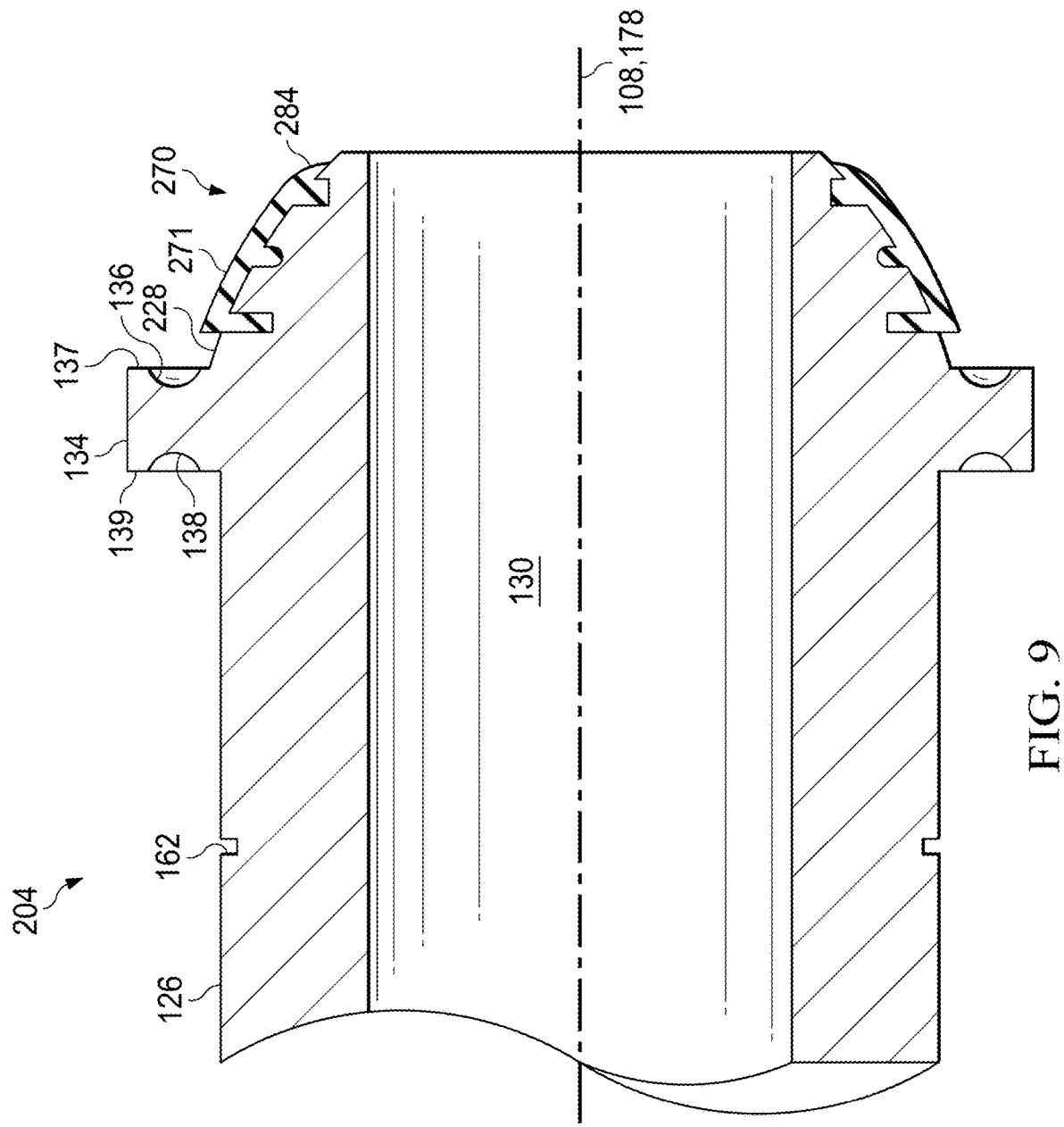
FIG. 9 is a cross-sectional side view of the primary seal of FIG. 8 mounted on the stem of FIG. 7 in accordance with another embodiment.

Referring now to FIGS. 7, 8, and 9, alternative embodiments of the stem and primary seal of the pipe swivel assembly are described. Except where otherwise indicated, features in FIGS. 7-9 that are the same or similar to those described in connection with the foregoing embodiment are identified using the same reference numerals, and a detailed description of those components will not be repeated. Referring first to FIG. 7, alternative stem 204 is substantially similar to the stem 104 previously described, except the stem 204 includes a tapered nose section 228 having one or more locating grooves formed on the radially outer surface instead of a recessed primary seat. In the illustrated embodiment, the tapered nose section 228 has a curved radially outward surface. For this embodiment, the socket section 112 (not shown) of the pipe swivel assembly will have a tapered sealing surface 119 in the throat 120 with a profile that corresponds to the taper of the nose section 228.

In the illustrated embodiment of the stem 204, a first locating groove 272 is provided proximate to the stem flange 134, a second locating groove 274 is provided proximate to the axially inward end of the stem 204, and a third locating groove 276 is provided between the first and second locating grooves. While the illustrated embodiment of the stem 204 includes three locating grooves on the nose surface 228, other embodiments can have different numbers of locating grooves. Each locating groove in the nose section 228 can have a different width (axially), depth (radially), and/or cross section, which as explained herein, can ensure correct and complete mounting of the primary seal. For example, in the illustrated embodiment, the first locating groove 272 is deeper than the second and third locating grooves 274 and 276. For another example, in the illustrated embodiment, the second locating groove 274 is wider than the first and third locating grooves 272 and 276. For another example, in the illustrated embodiment, the first and second locating grooves 272 and 274 have squared bottom surfaces (i.e., when viewed in cross-section, the respective groove bottom surfaces are positioned at 90 degrees to the respective groove walls) and the third locating groove 276 has a rounded bottom surface (i.e., when viewed in cross-section, the lower groove walls define a rounded, e.g., semicircular, path). Other embodiments can use different combinations of width, depth, and/or cross section for the locating grooves when multiple locating grooves are provided.

Referring now to FIG. 8, an alternative primary seal 270 is shown. The seal 270 can be formed of an elastomer, polymer or other flexible or resilient material to allow compression between the sealing surface 119 and stem nose surface 228. The primary seal 170 previously described in connection with FIG. 2 is configured as a tapered annular shell (e.g., truncated annular shell) having a cross-section that is generally rectangular and configured to lie in the recessed primary seat 132 of the stem 104 to hold the primary seal in position on the stem nose. In contrast, the alternative primary seal 270 of FIG. 8 has an annular seal body 271 configured to lie on the tapered radially outward surface 228 of the stem nose and includes one or more locating ribs extending from the seal body that are configured to fit into the locating grooves of the stem 204 to hold the primary seal in position on the stem nose. In the illustrated embodiment, the primary seal 270 further includes a tapered lip 284 extending axially inward from the front edge of the seal body 271 to prevent the seal from lifting during insertion into the socket section.

The seal body 271 of the primary seal 270 can be configured as a tapered annular shell around a seal central axis 178 that is coaxial with the central axis 108 of the swivel assembly. In the illustrated embodiment, the seal body 271 has a cross section with a concave radially-inward surface corresponding to the profile of the curved radially-outward surface of the nose 228 and a convex radially-outward surface corresponding to the profile of the radially-inward surface of the sealing surface 119 (not shown). In other embodiments, the cross section of the seal body 271 can be rectangular or trapezoidal, but overall still forming a tapered annular shell. The seal body 271 of the primary seal 270 is configured to resiliently deform between a first radial thickness when the primary seal is in an uncompressed state to a second radial thickness when the primary seal is fully compressed between the nose 228 and the sealing surface 119 to the predetermined distance by tightening the locking collar 106 against the socket 112. The radial thickness of the primary seal 170 or seal body 271 need not be constant at each distance from front edge to rear edge.

In the illustrated embodiment, the primary seal 270 includes an annular first locating rib 278 extending from the seal body 271 near its rear edge, an annular second locating rib 280 extending from the seal body near its front edge, and an annular third locating rib 282 extending from the seal body between the first and second locating ribs. While the illustrated embodiment of primary seal 270 includes three locating ribs, other embodiments can have different numbers of locating ribs. Each locating rib of the primary seal 270 can have a different width (axially), length (radially), and/or end cross section, which as explained herein, can ensure correct and complete mounting of the primary seal on the nose of the stem 204. Preferably, each locating rib of the primary seal 270 is configured to substantially fill, but not overfill, a corresponding locating groove on the nose 228 of the stem 204. As best seen in FIG. 9, in the illustrated embodiment of the primary seal 270, the first locating rib 278 has a first length, first width, and first end profile that are configured to substantially fill, but not overfill, the first locating groove 272 when the seal body 271 lies on the nose surface 228, the second locating rib 280 has a second length, second width, and second end profile that are configured to substantially fill, but not overfill, the second locating groove 274 when the seal body lies on the nose surface, and the third locating rib 282 has a third length, third width, and third end profile that are configured to substantially fill, but not overfill, the third locating groove 276 when the seal body lies on the nose surface.

The locating ribs 278, 280, 282 of the primary seal 270 and the corresponding locating grooves 272, 274, 276 of the stem 204 help retain the primary seal in place on the nose section 228 during insertion of the stem 204 into the socket section 112 and during operation of the swivel joint. The anchoring action of the respective locating ribs 278, 280, 282 withing the respective locating grooves 272, 274, 276 also helps prevent axial movement of the primary seal 270 when exposed to operating pressures. The annular configuration of the locating ribs 278, 280, 282 also allows them to slip (i.e., move circumferentially) in the grooves 272, 274, 276 as necessary when the stem 204 swivels relative to the socket 112.

It should be noted that neither disassembly nor reassembly of the disclosed pipe swivel assembly 100 requires the removal or insertion of individual ball bearing balls into the raceways as is required in conventional pipe swivels (e.g., Chiksan® style). Rather the disclosed pipe swivel assembly 100 allows the inner and outer bearings to be removed either as complete units, or at least as large subsections wherein the individual bearing elements (e.g., balls, rollers, needles) are caged or otherwise held together, which greatly reduces the time required for reworking the units. Further, for extremely high load service, the disclosed pipe swivel assembly 100 can utilize roller bearings or needle bearings instead of ball bearings. Conventional pipe swivels pipe swivels of the Chiksan® style cannot use roller bearings or needle bearings in place of individual ball bearings.

It will be appreciated by those skilled in the art having the benefit of this disclosure that this pipe swivel assembly that provides an easier to maintain and service solution to the challenge of high pressure piping connection. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A pipe swivel assembly for joining two pipes, wherein a first pipe can be connected to a first end of the swivel assembly, a second pipe can be connected to a second end of the swivel assembly, and a high pressure fluid can be carried through the swivel assembly from the first pipe to the second pipe, the swivel assembly comprising:
   a body including an annular socket section with internal threads defining a central axis along the axial direction, an annular neck section having a smaller diameter than the socket section and extending axially away from the socket section to a first end, and an annular transition section extending between the socket section and the neck section to define a tapering throat having an internal sealing surface;
   an inner bearing including a plurality of ball bearings configured in an annular arrangement, the inner bearing being disposed within the socket section contacting an axial face of the body adjacent to the throat;
   a stem including an annular nose section having a tapering external surface, an annular stem barrel section extending axially away from the nose section to a second end, and a stem flange extending radially out from the stem barrel section adjacent the nose section;
      wherein the nose section is positioned within the throat of the body at a predetermined distance from the internal sealing surface; and
      wherein an axially-inner face of stem flange contacts the inner bearing;
   an outer bearing including a plurality of ball bearings configured in an annular arrangement, the outer bearing being disposed around the stem barrel section and contacting an axially-outer face of the stem flange;
   a locking collar including an annular collar barrel section with external threads and a collar flange extending radially outward from the collar barrel section;
      wherein the collar barrel section is positioned around the stem barrel section of the stem;
      wherein the external threads of the collar barrel section are threadingly engaged with the internal threads of the socket section of the body;
      wherein an axial end of the collar barrel section contacts the outer bearing; and
   a primary seal extending the predetermined distance between the tapering nose section of the stem and the tapering internal sealing surface of the body;
   whereby the stem can rotate around the central axis relative to the body without breaking the fluid tight seal between the stem and the body.

2. A pipe swivel assembly according to claim 1, wherein the inner bearing consists of a first plurality of caged ball bearings without separate rings and the outer bearings consist of a second plurality of caged ball bearings without separate rings.

3. A pipe swivel assembly according to claim 2, wherein:
   a first raceway is formed on the axial face of the body adjacent to the throat;
   a second raceway is formed on the axially-inner face of the stem flange;

a third raceway is formed on the axially-outer face of the stem flange; and
a fourth raceway is formed on the axial end of the collar barrel section.

4. A pipe swivel assembly according to claim 1, further comprising:
a plurality of torque features formed on the collar flange of the locking collar; and
wherein the torque feature are at least one of:
radial holes formed around the rim of the collar flange;
notches formed around the rim of the collar flange;
notches formed on the sides of the collar flange; and
flat segments formed around the rim of the collar flange.

5. A pipe swivel assembly according to claim 4, further:
wherein the locking collar is a split collar comprising a plurality of arcuate sub-sections, and
wherein each sub-section includes a respective portion of the external threads.

6. A pipe swivel assembly according to claim 1, wherein the nose section of the stem includes a recessed primary seat for receiving the primary seal.

7. A pipe swivel assembly according to claim 6, wherein the nose section of the stem further comprises:
a first secondary seat formed on a first side of the primary seat for receiving a first secondary seal; and
a second secondary seat formed on a second side of the primary seat for receiving a second secondary seal.

8. A pipe swivel assembly according to claim 6, further
wherein the nose section of the stem is angled such that its radially-outward surface is neither perpendicular nor parallel to the central axis;
wherein the sealing surface of the body is angled such that its radially-inward surface is neither perpendicular nor parallel to the central axis; and
wherein the recessed primary seat is angled such that its radially-outward surface is neither perpendicular nor parallel to the central axis.

9. A pipe swivel assembly according to claim 8, wherein the primary seal is configured as a tapered annular shell centered on a seal central axis, the shell including:
a circular front edge with a first diameter,
a circular rear edge with a second diameter, wherein the second diameter is greater than the first diameter; and
a radial thickness compressible from a free thickness to the predetermined distance between the nose section and the sealing surface in the throat of the socket.

10. A pipe swivel assembly according to claim 1, further comprising:
a threaded passage formed through the socket section radially adjacent to the collar barrel section of the locking collar;
a set screw threadingly engaged in the threaded passage and selectively extendible and retractable by screwing motion;
wherein when the set screw is extended to contact the collar barrel section, the locking collar cannot rotate relative to the body; and
wherein when the set screw is retracted away from the collar barrel, the locking collar can rotate relative to the body.

11. A pipe swivel assembly for joining two pipes, wherein a first pipe can be connected to a first end of the swivel assembly, a second pipe can be connected to a second end of the swivel assembly, and a high pressure fluid can be carried through the swivel assembly from the first pipe to the second pipe, the swivel assembly comprising:

a body including an annular socket section with internal threads defining a central axis along the axial direction, an annular neck section having a smaller diameter than the socket section and extending axially away from the socket section to a first end, and an annular transition section extending between the socket section and the neck section to define a tapering throat having an internal sealing surface;
an inner bearing including a plurality of ball bearings configured in an annular arrangement, the inner bearing being disposed within the socket section contacting an axial face of the body adjacent to the throat;
a stem including an annular nose section having a tapering external surface, an annular stem barrel section extending axially away from the nose section to a second end, and a stem flange extending radially out from the stem barrel section adjacent the nose section;
wherein the nose section includes an annular first locating groove formed in the radially-outward surface of the tapered exterior surface, the first locating groove having:
a first radial depth;
a first axial width;
a first bottom end profile; and
wherein the nose section is positioned within the throat of the body at a predetermined distance from the internal sealing surface; and
wherein an axially-inner face of stem flange contacts the inner bearing;
an outer bearing including a plurality of ball bearings configured in an annular arrangement, the outer bearing being disposed around the stem barrel section and contacting an axially-outer face of the stem flange;
a locking collar including an annular collar barrel section with external threads and a collar flange extending radially outward from the collar barrel section;
wherein the collar barrel section is positioned around the stem barrel section of the stem;
wherein the external threads of the collar barrel section are threadingly engaged with the internal threads of the socket section of the body;
wherein an axial end of the collar barrel section contacts the outer bearing; and
a primary seal mounted on the tapering nose section of the stem, the primary seal including:
a seal body positioned on radially-outward surface of the nose and extending radially the predetermined distance to the tapering internal sealing surface of the body;
a first annular rib extending radially inward from the seal body at a first axial position relative to the front edge of the seal, the first rib having:
a first radial length;
a first axial width;
a first bottom end profile; and
wherein the first annular rib is received in the first locating groove of the nose, thereby holding the seal body in position on the nose;
whereby the stem can rotate around the central axis relative to the body without breaking the fluid tight seal between the stem and the body.

12. A pipe swivel assembly according to claim 11, further comprising:
wherein the nose includes an annular second locating groove formed in the radially-outward surface of the tapered exterior surface, the second locating groove having:

a second radial depth;
a second axial width; and
a second bottom end profile; and
wherein the primary seal includes a second annular rib extending radially inward from the seal body at a second axial position relative to the front edge of the seal, the second rib having:
a second radial length;
a second axial width; and
a second bottom end profile; and
wherein the second annular rib is received in the second locating groove.

13. A pipe swivel assembly according to claim 12, further comprising:
wherein at least one of:
the second radial length of the second rib is different from the first radial length of the first rib;
the second axial width of the second rib is different from the first axial width of the first rib; and
the second bottom end profile of the second rib is different from the first bottom end profile the first rib nose.

\* \* \* \* \*